US008874685B1

(12) United States Patent  
Hollis et al.

(10) Patent No.: US 8,874,685 B1
(45) Date of Patent: Oct. 28, 2014

(54) COMPLIANCE PROTOCOL AND ARCHITECTURE

(75) Inventors: Robert L. Hollis, San Antonio, TX (US); Gunnar Engelbach, Warner, NH (US); Randal Scot Taylor, Belmont, NH (US)

(73) Assignee: ThreatGuard, Inc., San Antonio, TX (US)

( * ) Notice: Subject to any disclaimer, the term of this patent is extended or adjusted under 35 U.S.C. 154(b) by 535 days.

(21) Appl. No.: 12/888,269

(22) Filed: Sep. 22, 2010

Related U.S. Application Data

(60) Provisional application No. 61/245,970, filed on Sep. 25, 2009, provisional application No. 61/244,645, filed on Sep. 22, 2009.

(51) Int. Cl.
*G06F 15/16* (2006.01)

(52) U.S. Cl.
USPC ............. 709/217; 709/223; 709/206; 726/21; 713/153; 713/170

(58) Field of Classification Search
USPC ...................... 709/203, 217; 726/1, 3, 23, 25; 713/188, 189, 191
See application file for complete search history.

(56) References Cited

U.S. PATENT DOCUMENTS

| 8,443,447 B1* | 5/2013 | Chen et al. ....................... 726/24 |
| 2005/0273850 A1* | 12/2005 | Freund ............................. 726/14 |
| 2008/0013717 A1* | 1/2008 | Brown et al. .................... 380/30 |
| 2009/0178140 A1* | 7/2009 | Cao et al. ......................... 726/23 |
| 2009/0313373 A1* | 12/2009 | Hanna et al. .................... 709/225 |
| 2010/0071030 A1* | 3/2010 | Rosenan et al. .................. 726/2 |
| 2010/0125897 A1* | 5/2010 | Jain et al. .......................... 726/7 |

\* cited by examiner

*Primary Examiner* — Hitesh Patel
(74) *Attorney, Agent, or Firm* — Fish & Richardson P.C.

(57) ABSTRACT

A process for centrally managing a large number of computers from a central location when technical expertise is not available at each end point nor can other remote management techniques be employed such as remote desktop or direct connection to an agent.

This process consists of the generation of processing instructions at a central point which can then be distributed to any number of endpoints in an asynchronous manner where they will be automatically applied and, if requested, response returned to the central management point asynchronously. The communication mechanisms are secure, verifiable, and require no special expertise at the endpoint to employ.

Asynchronous refers to the ability for processing instructions and responses to be transferred by a variety of methods but not solely dependent on direct communications, such as via a store-and-forward mechanism, and can also include server-side push directly to the endpoint and client-side pull from a predetermined rendezvous point. The processing instructions can include system settings checks, asset enumeration, messaging/user notification, security assessment, configuration changes, software installation/removal, or any combination, to include actions such as patch download and installation based on the results of a security assessment.

11 Claims, 25 Drawing Sheets

| Status | IP Address | Identifier | Compl. | Patch | Vuln | Last Assmnt. |
|---|---|---|---|---|---|---|
| OK | 192.168.100.3 | CLASSROOM | 46 | 100 | 100 | 2008-06-30 22:33:38 |
| OK | 192.168.100.1 | MAGNUS-T | 81 | 100 | 100 | 2008-06-30 22:30:42 |
| OK | 192.168.100.9 | HOTSALSA | 97 | 96 | 99 | 2008-06-30 22:36:29 |
| OK | 192.168.100.10 | GENIE | 70 | 100 | 99 | 2008-07-01 06:43:58 |
| OK | 192.168.100.100 | BIGDADDY-DC | 58 | 91 | 98 | 2008-06-30 22:50:24 |
| OK | 192.168.100.201 | BIGDADDY-MS | 68 | 94 | 99 | 2008-06-30 22:57:11 |
| OK | 192.168.199.63 | MAGNUS | 69 | 100 | 100 | 2008-06-30 22:53:23 |
| OK | 192.168.100.215 | Phaeton | 27 | -- | 93 | 2008-06-30 22:54:33 |
| OK | 192.168.100.20 | VAULT | 36 | 89 | 89 | 2008-07-01 04:51:00 |
| OK | 10.0.0.1 | HOTSALSA-10001 | 97 | 96 | 99 | 2008-07-01 06:49:30 |
| OK | 10.3.0.1 | MAGNUS-T-10301 | 56 | 100 | 100 | 2008-06-30 12:39:19 |
| OK | 10.2.0.1 | VAULT-10201 | 62 | 89 | 89 | 2008-07-01 06:48:58 |
| OK | 10.1.0.1 | GENIE-10101 | 70 | 100 | 99 | 2008-07-01 08:34:58 |
| OK | 10.1.0.2 | GENIE-10102 | 70 | 100 | 99 | 2008-07-01 08:35:17 |
| OK | 10.2.0.2 | VAULT-10202 | 62 | 88 | 89 | 2008-06-30 12:39:51 |
| OK | 10.0.0.2 | HOTSALSA-10002 | 97 | 96 | 99 | 2008-07-01 06:50:13 |

Composited Selection
Count: 1

Selected Target
NetBIOS Name: HOTSALSA [WORKGROUP]
Operating System: Microsoft Windows XP Professional
Status: Complete
Last Assessment: 2008-06-30-22:36:29
Composite Score: 97.3%

Detailed Assessment Results 500

- ✗ Do not automatically start Windows Messenger initially
- FDCC Security Settings
- ○ Account Policies Group
  - ○ Account Lockout Policy Settings
    - ✗ Account Lockout Duration
    - ✗ Reset Account Lockout Counter After
    - ✗ Account Lockout Threshold
  - ○ Password Policies
    - ✗ Maximum Password Age
    - ✓ Minimum Password Age
    - ✗ Minimum Password Length
    - ✗ Passwords Must Meet Complexity Requirements
    - ✓ Enforce Password History
    - ✓ Store Passwords Using Reversible Encryption for All Users in the Doamin Statistics: Targets that pass this rule: 0, fail: 1

Rule Details | Findings

Findings:
Password Policy: Minimum password length: Current Value = 7

Fix Actions:
Required Action: Change password policy Password Policy: Minimum password length (min_passwd_len) from 7 To 12.

[Explore] [Done]

FIG. 5

Secutor magnus

By ThreatGuard

Detailed Results

Total Hosts: 191

| Operating System | Count |
|---|---|
| Microsoft Windows XP Professional | 169 |
| Microsoft Windows Server 2003 | 21 |
| Sun Solaris 10 | 1 |

Assessment Times:
First: 2008-06-30 @ 12:39:05
Last: 2008-07-01 @ 08:51:06

Report Settings
Tolerance Level: 100.0%
Warning Level: 80.0%

Score: 619,712.0 / 796,523.0        77.8%

SCORE BREAKDOWN BY GUIDANCE

| | |
|---|---|
| FDCC: Guidance for Securing Microsoft Internet Explorer 7 for IT Proffessionals *(Federal Desktop Core Configuration version 1.0)* | 42.3% |
| FDCC: Guidance for Securing Microsoft Windows XP Systems for IT Professional *(Federal Desktop Core Configuration version 1.0)* | 94.5% |
| G2, Inc. Compliance Checks Benchmark For Securing Microsoft Windows Server 2003 Systems for Domain Controllers *(Domain Controller Specialized Security-Limited Functionality – High))* | 58.1% |
| G2, Inc. Compliance Checks Benchmark For Securing Microsoft Windows Server 2003 Systems for Member Servers *(Domain Controller Specialized Security-Limited Functionality – High))* | 72.8% |
| SCAP: Guidance fore Securing Sun Microsystems Solarais 10 Systems for IT Professionals *(scap_sol10_profile)* | 27.0% |

HOST STATISTICS

| | |
|---|---|
| Host per Score Range | 39.9% |
| Within Tolerance | 0.0% |
| In Warning Zone | 59.1% |
| Failed | 1.0% |
| Not Assesses | |

Worst Offenders
| | |
|---|---|
| phaeton 192.168.100.215 | 27.0% |
| VAULT 192.168.100.20, 192.168.100.21 | 36.6% |
| CLASSROOM 192.168.100.3 | 46.3% |

Targets not assesses within....
| 30 Days | 60 Days | 90 Days | 180 Days | 365 Days |
|---|---|---|---|---|
| 0% | 0% | 0% | 0% | 0% |

DEVIATIONS FROM POLICY

Authorized exceptions: 11172

Score (without exceptions): 276,512.0 / 796,523.0        34.7%

FIG. 6

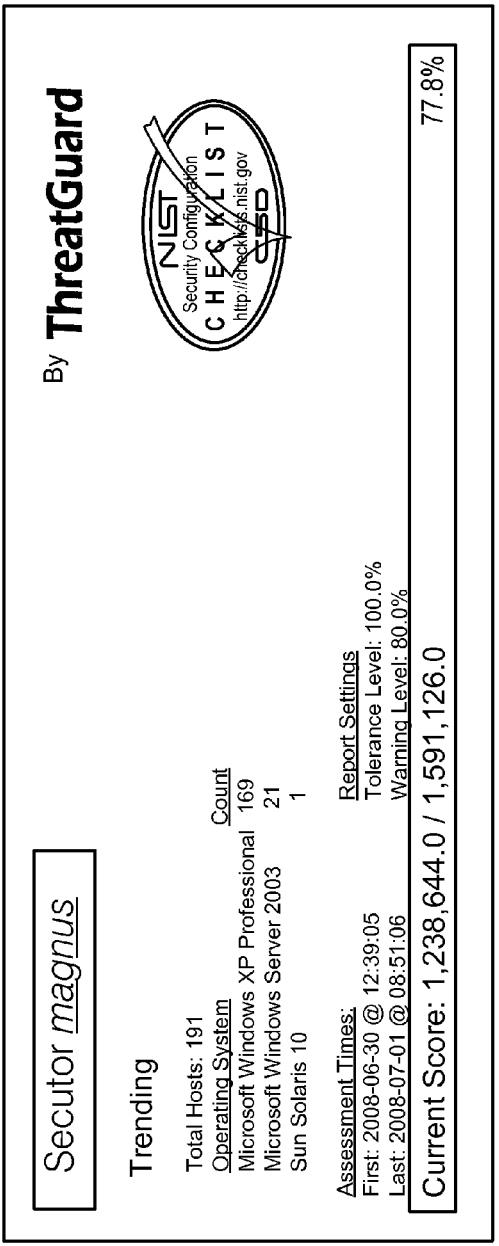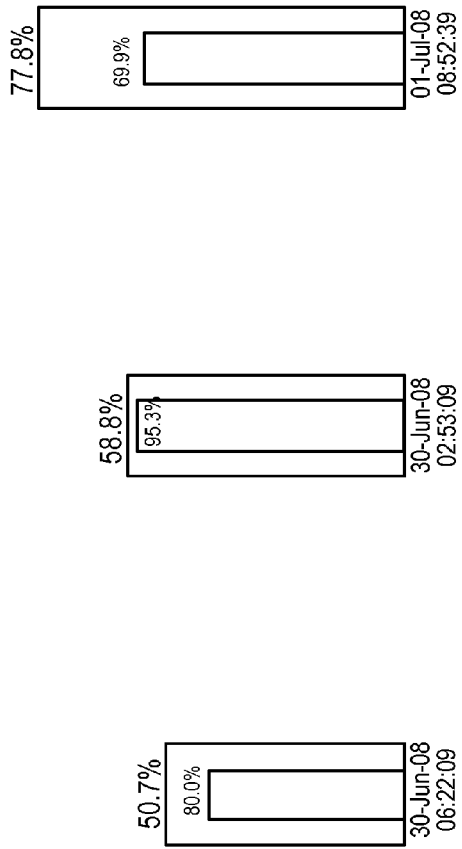
FIG. 7

COMPLIANCE PROTOCOL AND ARCHITECTURE

CROSS-REFERENCE TO RELATED APPLICATIONS

This application claims priority to U.S. Provisional Application 61/244,645, filed Sep. 22, 2009, entitled, "AGGREGATING STANDARDIZED ASSESSMENT DATA," and U.S. Provisional Application No. 61/245,970, filed Sep. 25, 2009, and entitled, "ASYNCHRONOUS COMMUNICATIONS." These applications are incorporated by reference.

TECHNICAL FIELD

This document relates to compliance architectures.

BACKGROUND

Security remains a constant and problematic concern for administrators. The risk to vulnerable systems from threats residing, for example, on the Internet, can place valuable assets at risk, jeopardize mission readiness, and causes other concerns. Administrators can spend countless hours and commit limited resources in attempting to address these threats.

DESCRIPTION OF DRAWINGS

FIG. 1 is a user interface that illustrates how results from a compliance profile may be displayed.

FIG. 5 is a user interface that illustrates detailed assessment results for a compliance profile.

FIG. 6 is a user interface that illustrates a score for a compliance profile that is broken down by constituent guidelines.

FIG. 7 is a user interface that illustrates temporal scores for a compliance profile.

DETAILED DESCRIPTION

Figure 2:
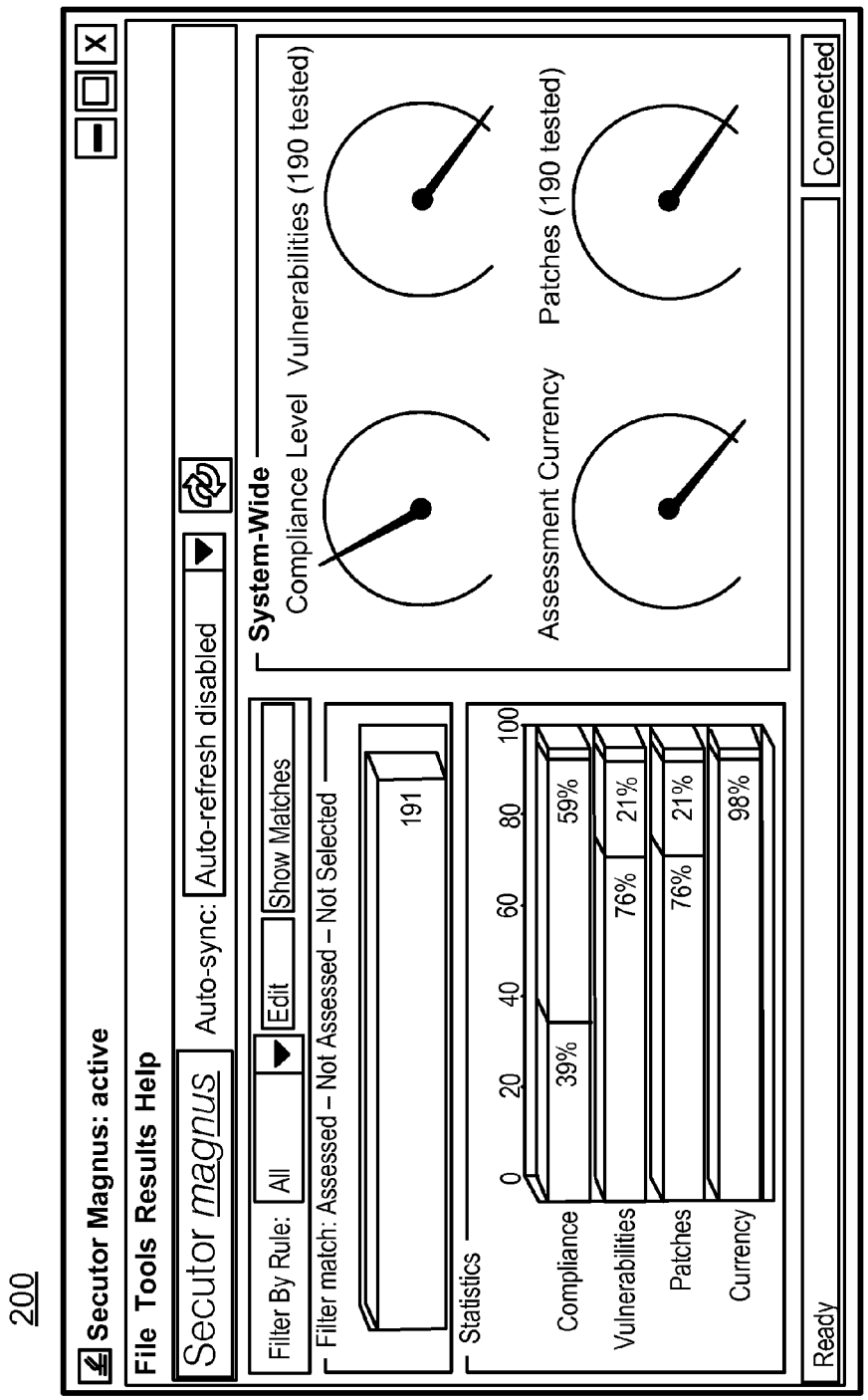
FIG. 2 is a user interface that illustrates how organizational compliance profile may be displayed in a manner that enables an administrator to perceive compliance levels, vulnerabilities, assessment currency, and patches.

In one sense, the industry of standardized assessments for computer security vulnerabilities, compliance, inventory, and other computing system weaknesses introduces extended implied requirements in the process of global aggregation. Global aggregation refers to representing the assessment scores and results of all endpoints of all locations of an organization, where an organization can be an office, campus, company, or a community or related sub-organizations. Electronic communication lines that interconnect the organization may be of low quality to non-existent, making it difficult or impossible to perform global aggregation via traditional means. Global aggregation actions should also support the correlation of standards-based references with the assumption that an aggregation point has no prior exposure to those references.

Data related to a compliance survey may be stored in a results file. The results file may include aggregated scores and results across various categories of interest. The results file also may include a description of the calculations used to produce scores and also counts for each category as aggregated from different assessed endpoints within that category, broken down by each standards-based reference. Thus, an administrator may manipulate data in the results file to receive detailed analytics related to a particular condition, type of devices, location, organization, and/or concern.

A system administering a compliance survey and generating the results file may track and distribute the results file in a distributed manner. For example, higher lever analytics may be stored on a management console (or server). The management console may include a results file that includes a higher level description of the organizational hierarchy. This process aggregates computer security configuration and vulnerability situational awareness data that enables a system administrator to perceive higher level data without requiring the management console to store the entire database. The results file may include metadata that enables the management console to retrieve more detailed information as required. For example, the results file may include an XML file (eXtensible Markup Language) that indicates that the detailed information for client devices residing in a first office are located on a first server and that detailed information for client devices residing in a second office are located on a second server. Detailed information for network devices may be stored on a third server, for example, configured to also administer an Simple Network Management Protocol ("SNMP") monitoring system. A SNMP server may be configured to review its SNMP logs to develop a compliance profile. The management console may reference metadata in the results file in order to derive higher level analytics and retrieve additional information from the SNMP server in order to perform more detailed drill down analytics.

Multiple layers of systems may be used in a reporting hierarchy. For example, a first management console may use a results file to administer a helpdesk and logistics system while a second management console may use a results file to administer a security and intrusion detection system. Multiple layers of intermediate systems may be used to aggregate results. The results file may include metadata that identifies the immediately adjacent reporting systems and/or also identifies a more complete map of the reporting system with multiple upstream reporting systems.

Each of the reporting systems may use a focused algorithm to generate a descriptive data set designed to be forwarded to higher level systems. The descriptive data set may be designed to be small and/or translated to a generic format in order to enable assimilation of results from disparate systems.

The use of the focused algorithm and/or small results files may be dynamically reconfigured to supports massively scalable and hierarchical presentation of data. For example, a management console may instruct constituent devices that a simplified data set should be used when one million devices are being surveyed across a multiple level aggregation hierarchy. Thus, each of the survey engines and/or nodes in the aggregation hierarchy may be configured to tailor the results file so as to not exceed a certain size. Alternatively, or in addition, the survey engine may simultaneously generate a metadata description that indicates the particular convention that was used to aggregate the data and also reveals the location where the source data has been stored if more detailed information is required during a drill down operation.

The accompanying metadata thereby provides a reachback path to the originating details. The scope of the operation may be used to indicate the degree to which the data set should be simplified. For example, a management console may request information that is only associated with a small aspect of a compliance survey. As the management console transmits the request to intermediate systems, the request may include that the returned results file should only address the requested information. As a result, the intermediate systems may run a less computationally intense survey and return a small results file. The less computationally survey may include an XML tag that indicates the location of the larger data sets.

To ensure the references are correlated properly at the aggregation point, a set of metadata for each reference is included in the results file. The results file also provides cross-references to associate scores and results with their driving policies and control documents. This process enables the dynamic reconstruction of high-level assessment data at any aggregation point. Thus, a management console working with a SCAP server may analyze the XML tags to ensure that the higher data being assimilated is valid so that the integrated data in fact reflects the underlying commonalities.

The aggregation system (e.g., a SCAP server or management console) also may take into account an organization's dynamic hierarchy. For example, if intermediary nodes of the hierarchical reporting structure are disabled or removed, subordinate nodes may still be configured to report by simply choosing a different parent in the hierarchy. The reporting path may be changed dynamically or on a periodic basis without altering the logical organizational structure of the aggregated data.

In another sense, network administrators for an organization often struggle with performing configuration management. For example, a network administrator in the federal government may be charged with managing several thousand devices. A network administrator may be charged with protecting devices from malicious Internet threats. In addition, the network administrator also may be charged that computing devices for an organization are only used for their intended purpose.

One of the key challenges facing the network administrator is understanding the status of organizational resources (e.g., client devices, servers, firewalls) relative to authorized and/or desired configurations. For example, the National Institute of Standards and Technology maintains the Security Content Automation Protocol (SCAP). SCAP is a compliance protocol that combines a number of standards that are used to enumerate software flaws and configuration issues related to security. SCAP measures systems to find deviations from a desired state and generates a score for a compliance profile that reflects an evaluation of the possible impact. With its categorization of vulnerabilities, SCAP may be used to automate vulnerability management, measurement, device and software enumeration, and policy compliance evaluation. Specifically, SCAP may be used to define how the constituent components may be combined. For example, SCAP may be used to incorporate standards that include Common Vulnerabilities and Exposures (CVE), Common Configuration Enumeration (CCE), Common Platform Enumeration (CPE), Common Vulnerability Scoring System (CVSS), Extensible Configuration Checklist Description Format (XCCDF), and Open Vulnerability and Assessment Language (OVAL).

Thus, a network administrator may manage security in an automated manner using SCAP. A description of a SCAP configuration is received from a configuration server and using the Secure Content Automation Protocol (SCAP). For example, a network administrator may instruct a server to launch a survey on client devices that includes the most current instantiation of SCAP. The description of the SCAP configuration is loaded to a compliance engine on a first client. Using the compliance engine, a SCAP survey is executed using the SCAP configuration. Specifically, a client device may determine whether the indicated vulnerabilities and issues exist. Based on executing the compliance engine, a first SCAP compliance profile is developed. The client device may develop a description of which vulnerabilities and problematic conditions exist, and which ones have been addressed. The first SCAP compliance profile is provided to a reporting system. In one configuration, a client server application on the client device transmits the SCAP compliance profile to a server that is tracking organizational SCAP compliance.

In illustrating how a network administrator may administer a SCAP regime, FIGS. 1-9 illustrate various user interfaces that a network administrator may use to distribute an SCAP configuration and track SCAP profiles resulting from executing a SCAP survey on various devices. For instance, FIG. 1 is a user interface 100 that illustrates how results from a compliance profile may be displayed. Specifically, user interface 100 includes a list of devices that indicates the status of the device, the IP address of the device, and the identifier for the device. Each device is also associated with a score that indicates the degree of compliance, a patch score, and the degree to which vulnerabilities exist. Finally, each device also includes an indication of when the last assessment was performed. The compliance score indicates the extent to which a particular system complies with a configuration. For example, some organizations may include a policy that certain services not be used, or that certain services only be used in certain configurations. The patch score indicates the extent to which patches have been administered. The patches may be scored to reflect the significance of the patch, and may reflect whether a patch is required for performance, reliability, and/ or security. The vulnerability score indicates an extent to which a system is at risk for malicious and/or undesirable activity.

User interface 100 includes a display for a selected target. The selected target includes a description of an underlying system. A user may select the details tab to display additional information related to one or more constituent components in the score. In one configuration, the sources with a larger impact on score are identified.

FIG. 2 is a user interface 200 that illustrates how organizational compliance profile may be displayed in a manner that enables an administrator to perceive compliance levels, vulnerabilities, assessment currency, and patches. The filter match indicates the number of systems that were assesses. The statistics portion then indicates the percentage of systems that meet different thresholds of scoring. For example, user interface 200 indicates that 39% of the system have a first degree of compliance, 59% of the system have a second degree of compliance, and a remaining portion of systems have a third degree of compliance. Similarly, 76% of the systems have a first vulnerability score, 21% of the systems have a second vulnerability score, and a remaining portion of systems have a third vulnerability score. Finally, the currency score indicates that 98% of the system is has been assessed with a current SCAP configuration.

User interface 200 includes different filters that enable a network administrator to assess different portions of the organization. The filter in user interface 200 may be modified so that particular systems, topologies, locations and/or configurations. The network administrator may pull up a report that displays the SCAP profile for laptops used by a company's sales force. The network administrator then may investigate the source for any discrepancies and schedule remedial action in response.

Figure 3:
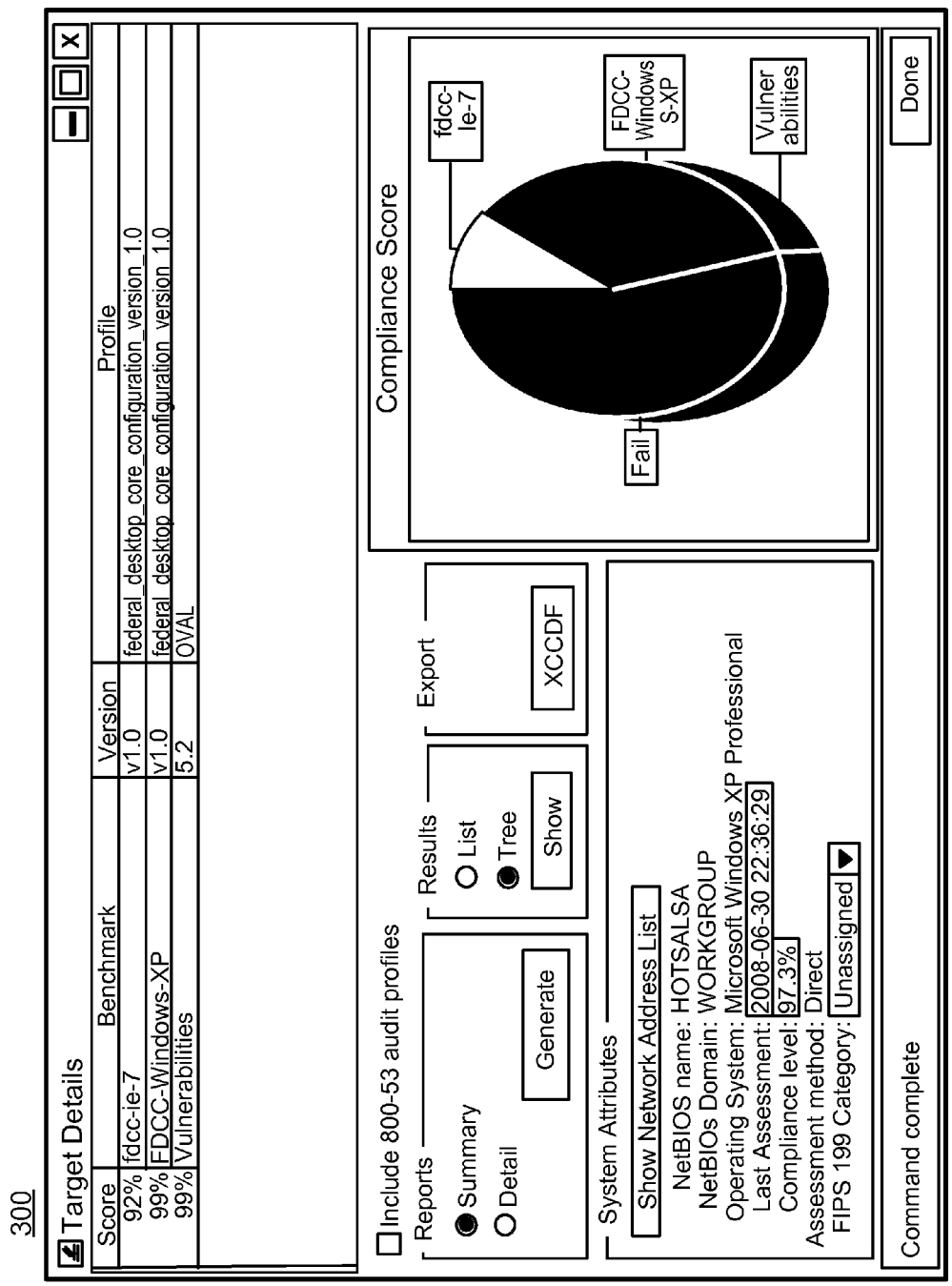
FIG. 3 is a user interface that illustrates a score for a compliance profile relative to different standardized compliance profiles.

FIG. 3 is a user interface 300 that illustrates a score of a compliance profile relative to different standardized compliance profiles. User interface 300 indicates that three benchmarks are being considered, and a score associated with each benchmark. The network administrator then may specify an audit profile to display summary and/or detailed information. User interface 300 then includes a pie chart with a compliance score that indicates constituent components for components for each score. Thus, the portion of each score associated with each benchmark is shown in an additive fashion with the "failing" portion indicating the extent to which the score is identified as failing.

Figure 4:
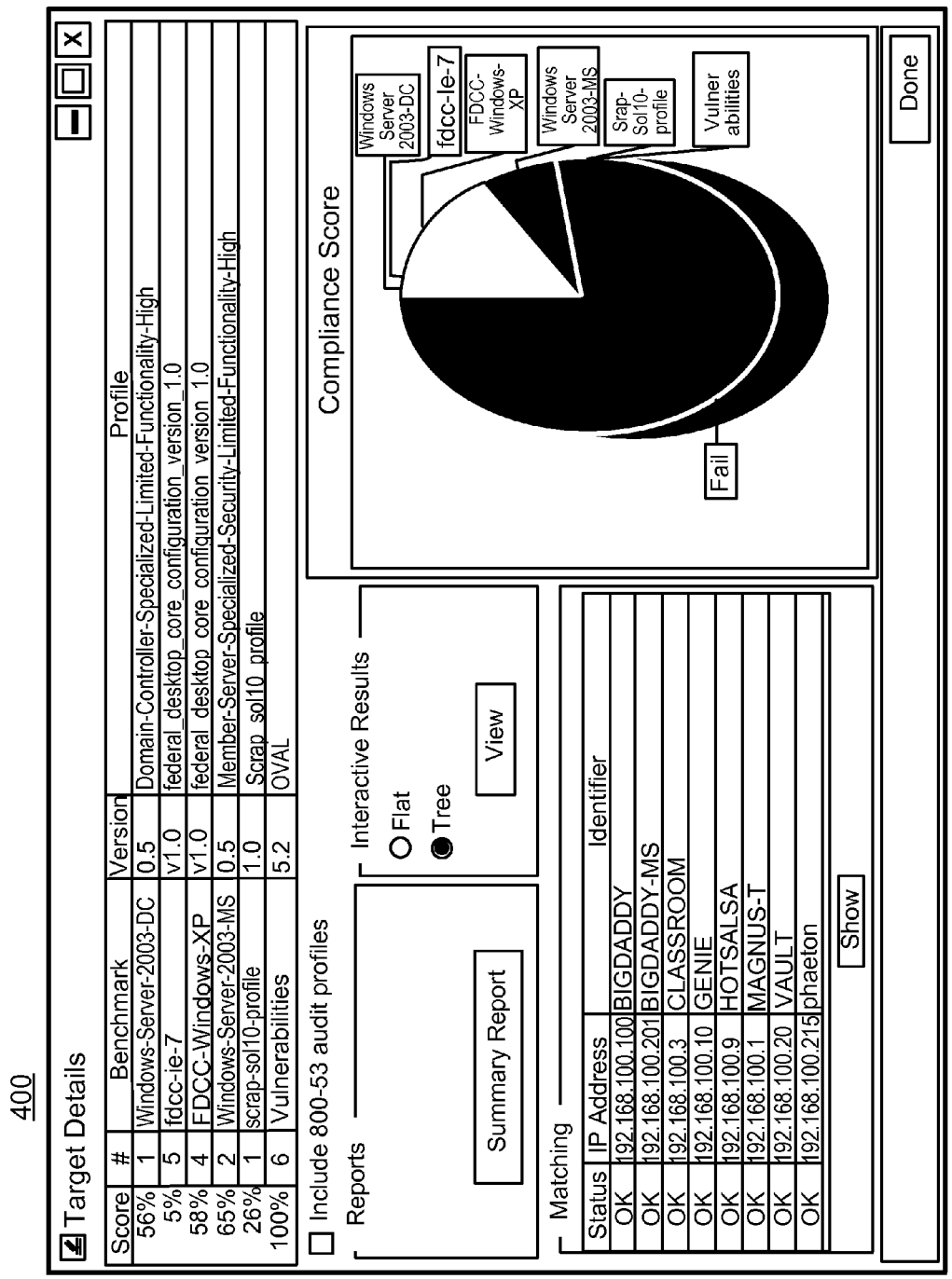
FIG. 4 is a user interface that illustrates constituent components for a score for a compliance profile.

FIG. 4 is a user interface 400 that illustrates constituent components for a score for a compliance profile. In particular, user interface 400 indicates a scope used for a SCAP survey by indicating which benchmarks are used, and the score for each associated benchmark. User interface 400 then includes a listing of different systems as identified by an Internet Protocol (IP) address and an identifier. The status of each system as being "OK" is then identified.

FIG. 5 is a user interface 500 that illustrates detailed assessment results for a compliance profile. A network administrator may expand a label for a system of interest (e.g., a client device) to investigate the basis for a scoring system. A numerical scoring system may be implemented that assigns points for each field that is investigated. As shown, a password assessment is investigated to encourage use of strong password policy. The password assessment investigates whether there is a maximum and minimum password age, a minimum password length, a complexity requirement, whether password history is enforced, and whether passwords are stored using reversible encryption for all users in the domain. As a particular rule or provision in a rule is selected, the display is updated to indicate the number of systems in a target pool that comply or fail the rule. User interface 500 then includes a recommended corrective action ("fix actions") to assist a network administrator in addressing a potentially problematic configuration. Although the corrective action show is narrative, the corrective action may automatically launch a job that remedies the configuration. In one configuration, the user may launch a job that requires the user to perform an action, such as change a password. In another configuration, the user may be prompted to waive or change a rule so that the score does not reflect the value for a particular provision. In yet another configuration, the user may launch a job on a server system (or a client device) that automatically corrects the problematic condition. This may include removing certain applications, services and applications that cause the discrepancy.

FIG. 6 is a user interface 600 that illustrates a score for a compliance profile that is broken down by constituent guidelines. User interface 600 indicates that the compliance profile reflects 169 Windows XP professional systems, 21 Windows Sever 2003 Servers, and 1 Sun Solaris 10 system. Two assessments have been run. A tolerance level of 100% means that every system is still permitted to operate irrespective of the particular configuration. A warning is generated for systems that receive a score of less than 80%. In other configurations, systems that fail to comply with a threshold score are precluded from accessing a network.

User interface 600 includes a score breakdown according to guidance for the different benchmarks. The host statistics are then analyze the percentage of systems that are within a specified tolerance level, warning level, failing level, or whether the system was not assessed. The worst offenders are then identified. User interface also indicates that certain deviations from policy are being used. Specifically, there are 11,172 authorized exceptions. Alternative scores that reflect the selective incorporation of deviations is shown. The ability of a network administrator to authorize deviations may become important, particularly when a particular score is required in order to maintain authorization to operate. A network administrator then may maintain a deviation because of operational requirements, or gradually remove the authorized exceptions as the problematic system is remedied.

FIG. 7 is a user interface 700 that illustrates temporal scores for a compliance profile. User interface first includes a description of the systems that are being analyzed and an indication of when the systems were assessed. The current score is displayed relative to the maximum score, along with an indication of the percentage of issues that have been addressed.

A graph showing trends over time is then shown. For example, the graph may show the scores over times the score for certain systems or classes of systems over time, the score relative to a required threshold over time, or the score relative to specified configuration over time.

Figure 8:
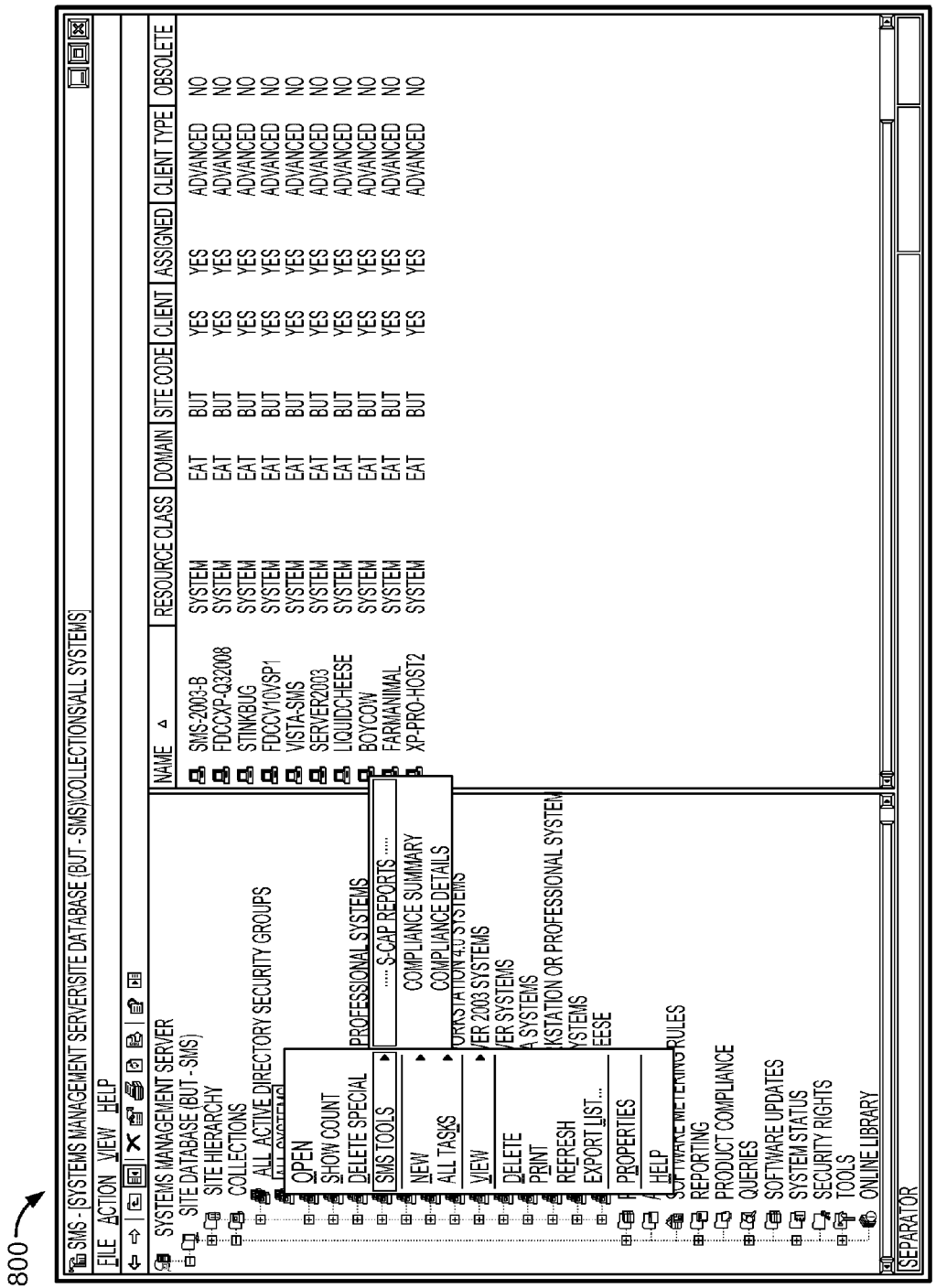
FIG. 8 is a user interface that illustrates a management console for administering a compliance profile.

FIG. 8 is a user interface 800 that illustrates a management console for administering a compliance profile. As shown, a Systems Management Server (SMS) interface is shown that categorizes an organization with respect to an organizing criteria. The organizing criteria may reflect the operating system, the mission, the domain, the location, or the device type. SMS includes a client and server component to update software. By using SMS functionality on both client and the server, a network administrator may direct SCAP surveys to be executed and reported using the SMS infrastructure.

The user may select an object or structure appearing in the user interface 800 and select from one or more options associated with each object. As shown, the user has selected all systems and indicated that SCAP reports that display a compliance summary and compliance details. The user may select a more detailed class of systems and launch SCAP actions related to the more detailed class.

Alternatively, the user may select a benchmark within SCAP and run a SCAP survey using the constituent benchmark. The results may reflect the configuration of a survey as only being executed against a narrower class of systems. For example, the SCAP survey may be run against server systems. The score and SCAP compliance profile reflects that the SCAP survey was only run against the identified server systems. Thus, the results of the SCAP survey may be more meaningful as the results are not diluted to reflect values for systems that do not relate to the analytics being performed.

Although SMS is described as distributing the SCAP configuration and begin a SCAP survey, other mechanisms may be used to transport SCAP information. SCAP information may be transported using resident applications on a device (e.g., a native application on a PC), SOAP/SSL, NetBIOS/DCOM, and SSH. In one confirmation, SCAP information is transported using electronic mail messaging systems.

Figure 9:
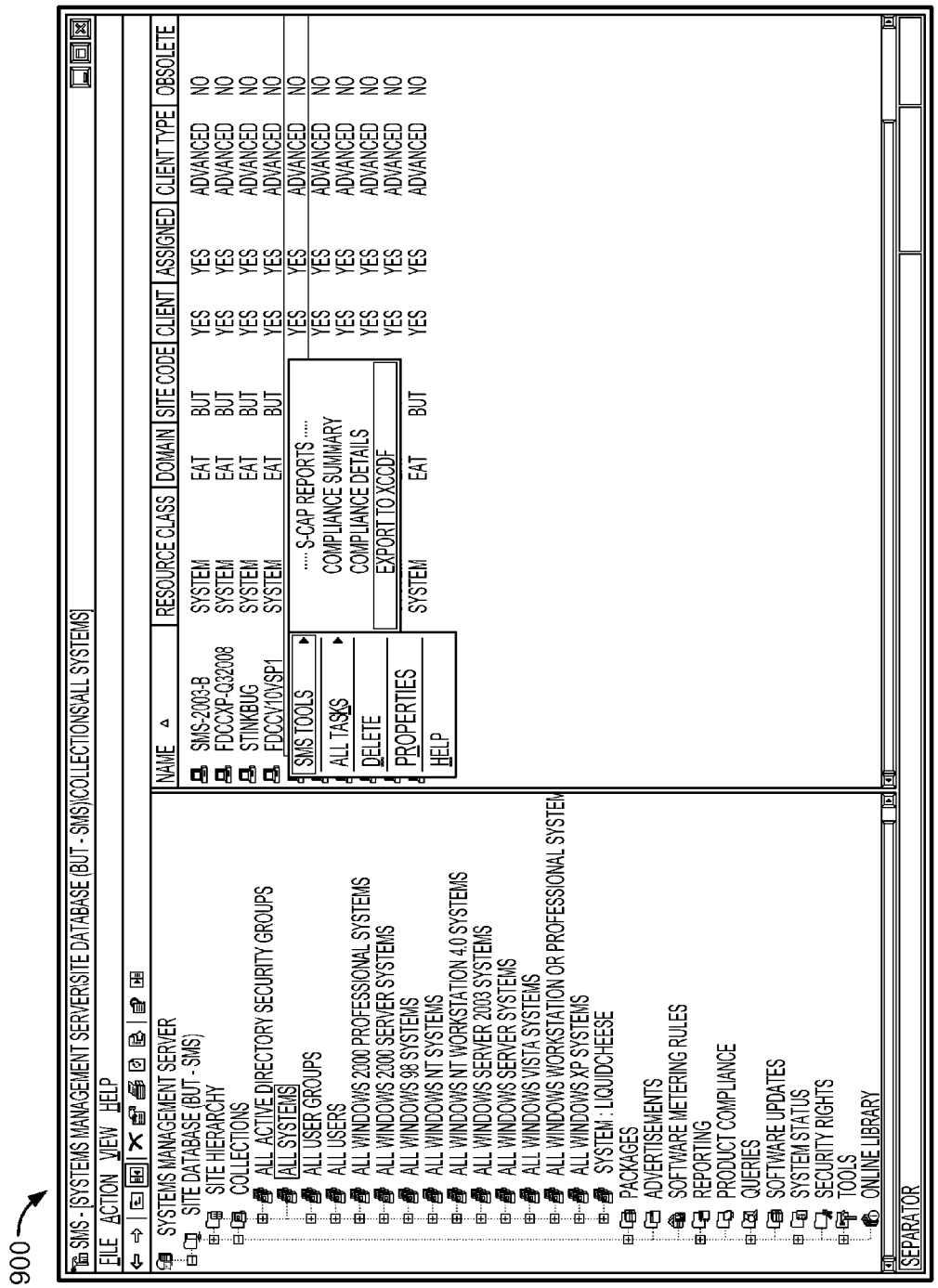
FIG. 9 is a user interface that illustrates how results may be outputted in a management console configured to administer a compliance profile.

FIG. 9 is a user interface 900 that illustrates how results may be outputted in a management console configured to administer a compliance profile. User interface 900 illustrates that a SCAP compliance profile for a resource class may be exported to the XCCDF format.

Figure 10:
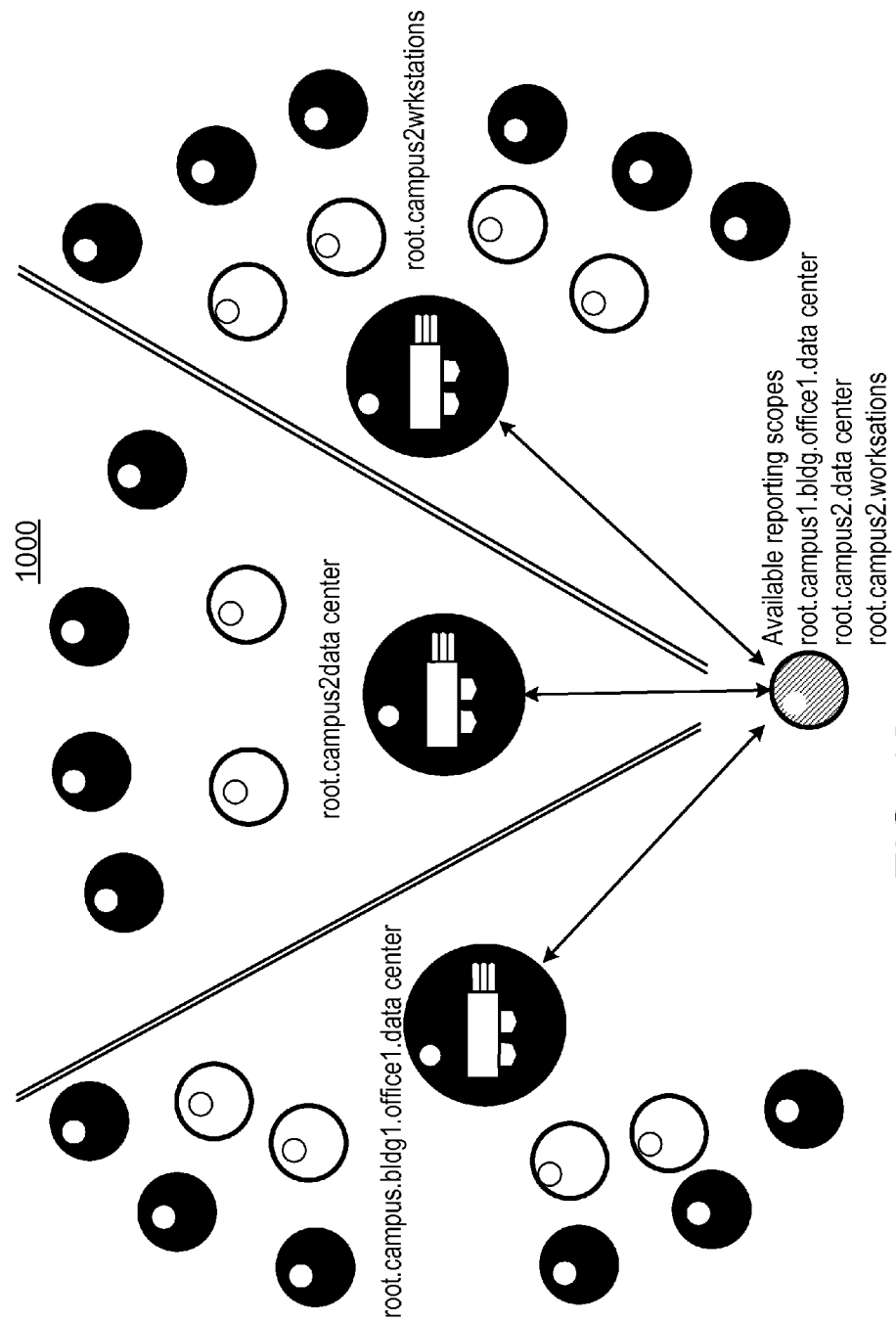
FIG. 10 is an organizational map that illustrates how a compliance protocol may be targeted to an organization using a topographical reference.

FIG. 10 is an organizational map 1000 that illustrates how a compliance protocol may be targeted to an organization using a topographical reference. Organizational map 1000 includes three domains (root.campus1.bldg1.office1.datacenter, root.campus2.datacenter, root.campus2.workstations), each of which may be identified under a reported scope. A network administrator may launch a SCAP survey with respect to one of the domains, or the network administrator may analyze previously identified results to distill information associated with a particular domain by only using systems for the identified domain in the scope of the reporting engine. Organizational map 1000 indicates that different classes of devices appear within the domain. For example, the first class of objects may represent servers while second class of objects may represent client devices.

In one sense, organizational map 1000 is a topographical map that illustrates the logical structure for a different domain. However, organizational map 1000 also may represent a user interface presented to a network administrator to manage organizational resources. The organizational map 1000 may be presented, for example, as part of user interface 900, where a user right clicks on the different objects to retrieve analytical information for one or more devices and/or launch a task for the selected object.

Figure 11:
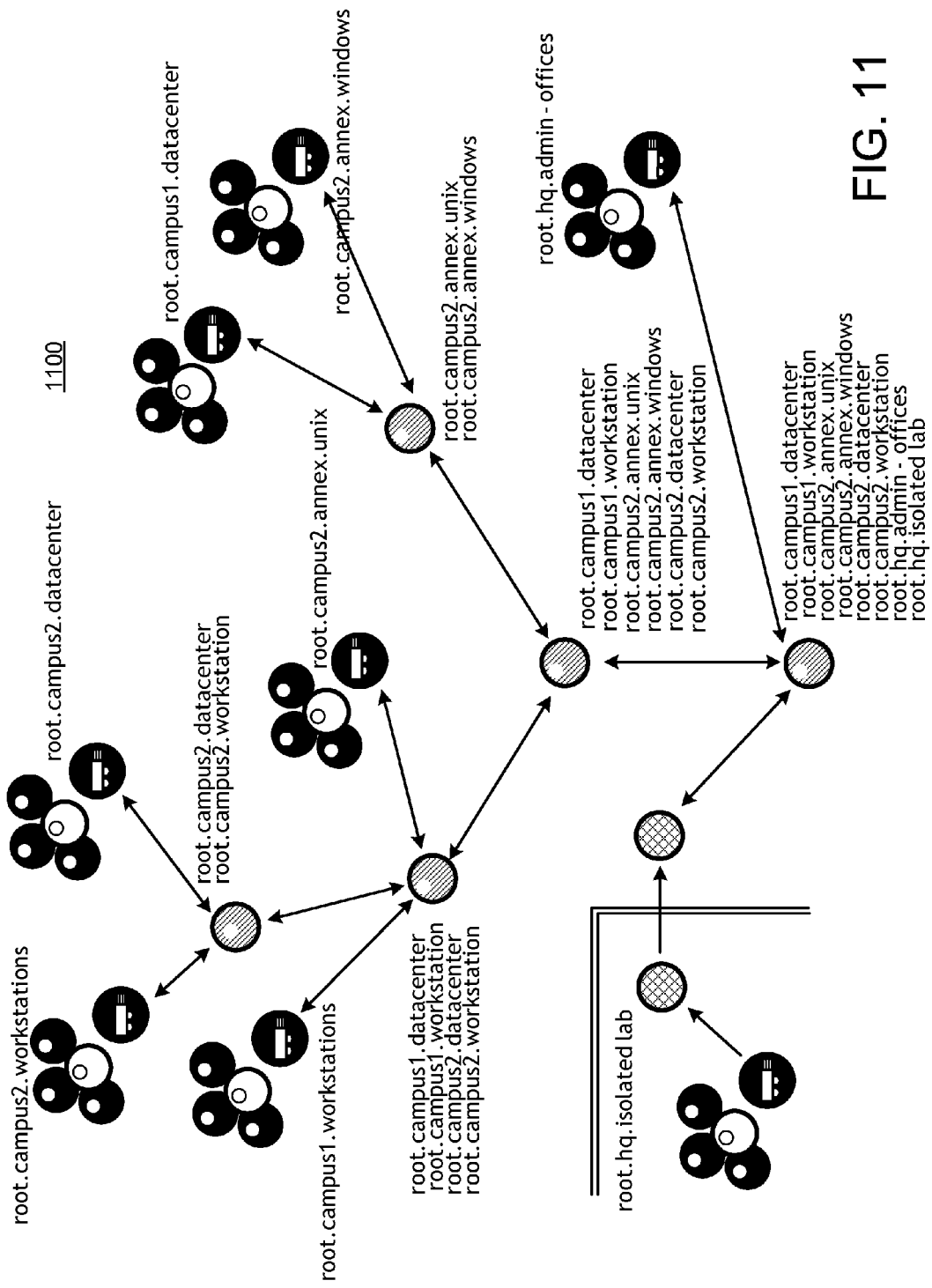
FIG. 11 is an organizational map that illustrates how a compliance protocol may be hierarchically targeted to an organization using a topographical reference.

FIG. 11 is an organizational map 1100 that illustrates how a compliance protocol may be hierarchically targeted to an organization using a topographical reference. In particular, each depicted objects represents attributes of the constituent nodes. A higher level object therefore may be controlled to effect changes to the constituent objects within the higher level object's hierarchy. And, like organizational map 1000, organizational map 1100 also may represent a user interface presented to a network administrator.

Figure 12:
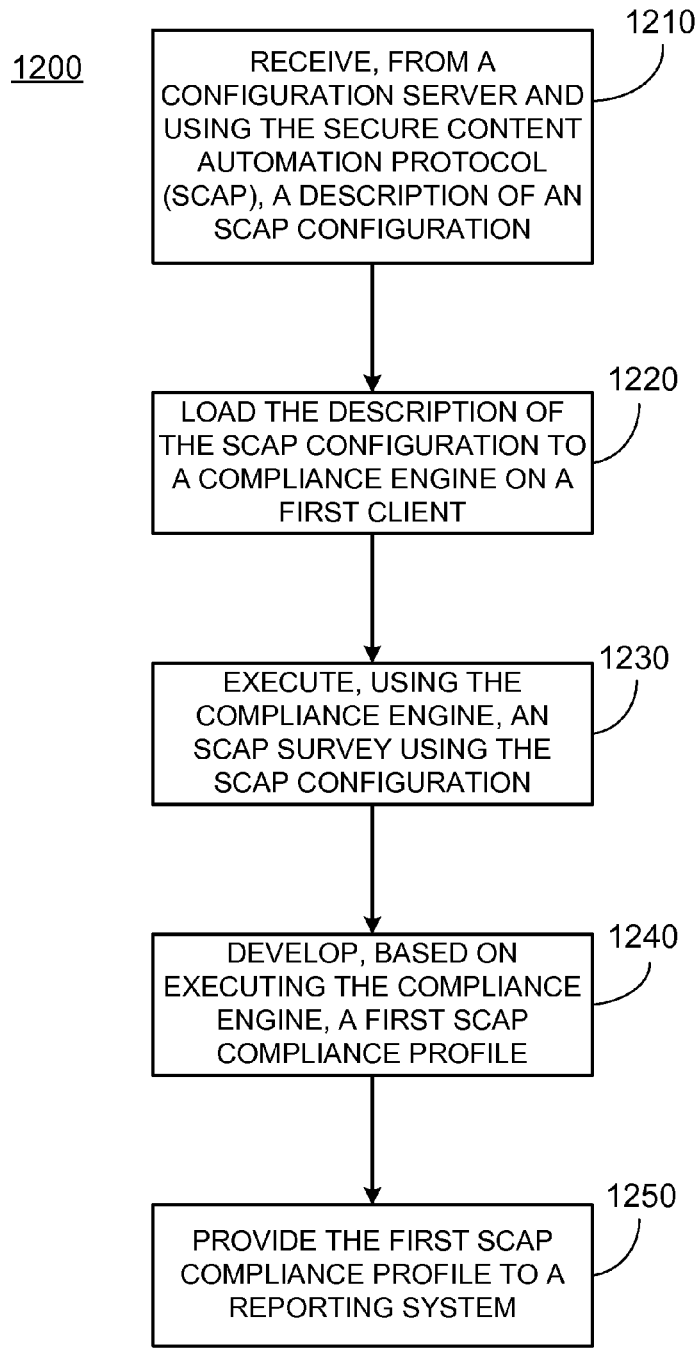
FIG. 12 is a flow chart of a process by which a compliance profile is provided to a reporting system.

FIG. 12 is a flow chart of a process 1200 by which a compliance profile is provided to a reporting system. Generally, process 1200 relates to a method of managing security in order to provide the user interfaces and maps shown previously in FIGS. 1-11. However, the operations shown in process 1200 may be used to generate other user interfaces.

Initially, a description of a SCAP configuration is received from a configuration server and using SCAP (1210). Receiving a SCAP configuration may include receiving an update from a distributor charged with keeping SCAP current. In one instance, receiving the SCAP configuration includes receiving the SCAP configuration from a government-operated SCAP server that receives updates from various government organizations. In another instance, receiving the SCAP configuration includes receiving the SCAP configuration from a corporate distribution service. The corporate distribution service may assimilate inputs from various government agencies and private commercial security companies that identify threats. The corporate distribution service may transcribe the inputs and advisories so that the SCAP configuration can be readily adopted by a compliance engine on one or more devices.

The description of the SCAP configuration is loaded to a compliance engine on a first client (1220). Loading the SCAP configuration to the compliance engine may include distributing the SCAP configuration via an electronic mail messaging, SMS ("Systems Management Server"), SOAP/SSL ("Simple Object Access Protocol/Secure Sockets Layer"), NetBIOS/DCOM ("Network Basic Input/Output System/Distributed Component Object Model"), and/or SSH ("Secure Shell"). Distributing the SCAP configuration may be triggered in response to various criteria. In one configuration, the SCAP configuration is distributed on a periodic basis to inspire execution of a SCAP survey on the periodic basis. In another configuration, the SCAP configuration is distributed in response to triggering events, such as the distribution of a critical advisory from a security institution (e.g., an advisory from an operating system manufacturer). Distributing the SCAP configuration may be oriented to the specific device receiving the SCAP configuration. Network infrastructure devices may receive a SCAP configuration oriented towards network infrastructure devices while client devices receive SCAP configurations oriented towards client devices, and server systems may receive SCAP configurations oriented towards server systems.

Distributing the SCAP configuration may include distributing a targeted, partial, or focused SCAP configuration. For example, a network administrator may only be interested in identifying compliance with a narrow set of parameters for a critical update. Distributing the SCAP configuration then may instruct client devices to analyze only 10 factors appearing in a single benchmark.

A SCAP survey is executed using the compliance engine with the SCAP configuration (1230). Executing the SCAP survey may include executing the SCAP survey at a specified time, or under specified operating conditions. If processor utilization is above a specified threshold, the SCAP survey may be delayed until utilization decreases below the threshold.

Executing the SCAP survey may be used as the triggering event in order for other important actions to take place. For instance, access to user applications may be limited or precluded until a compliance profile for a device indicates that a threshold degree of compliance has been achieved. Thus, a user commencing their workday and booting up a client device may be precluded from accessing messaging and Internet services until the compliance engine determines that a score of 80% has been achieved.

If a threshold score has been achieved, the user may be permitted to access specified applications. If a threshold score has not been achieved, one or more consequential actions may be performed. In one instance, identifying that the client device is below an alarm score triggers an alarm that requires a technician to reconfigure the client device and make necessary changes before the user is permitted to access the specified applications. In another instance, the user is permitted to use some or all of the applications, but a work order is initiated that instructs a technician to reconfigure the user's client device. In yet configuration, the user is permitted to use an application in a first mode (e.g., email other personnel within the organization) but not use the application in a second mode (e.g., email external users).

Based on executing the compliance engine, a first SCAP compliance profile is developed (1240). The first SCAP compliance profile identifies the configuration of a device relative to one or more benchmarks. The first SCAP compliance profile may include both detailed forensics indicating specific values for specific tests, and higher level descriptions indicating the overall state of a client device. The data in a compliance profile may be structured in order to assimilate data from disparate devices and enable detailed analytics. Specifically, the values may include supplemental labels that are not part of a benchmark or standard. Nevertheless, the supplemental labels may be used so that a reporting system processing a first and second compliance profile may be categorized to enable drill-down analytics. The drill-down analytics may be presented, for example, using the organizational maps that enable a network administrator to perceive results by device type.

The first SCAP compliance profile is provided to a reporting system (1250). Providing the first SCAP compliance profile to the reporting system may include providing the first SCAP compliance profile alongside other SCAP compliance profiles from other compliance engines that enable an organizational SCAP compliance profile to be developed. Providing the SCAP compliance profile to a reporting system may include providing the first SCAP compliance profile using a different delivery mechanism that the mechanism used to deliver the SCAP configuration. For example, the SCAP configuration may be delivered using SMS and the first SCAP configuration profile may be provided using SOAP/SSL.

Figure 13:
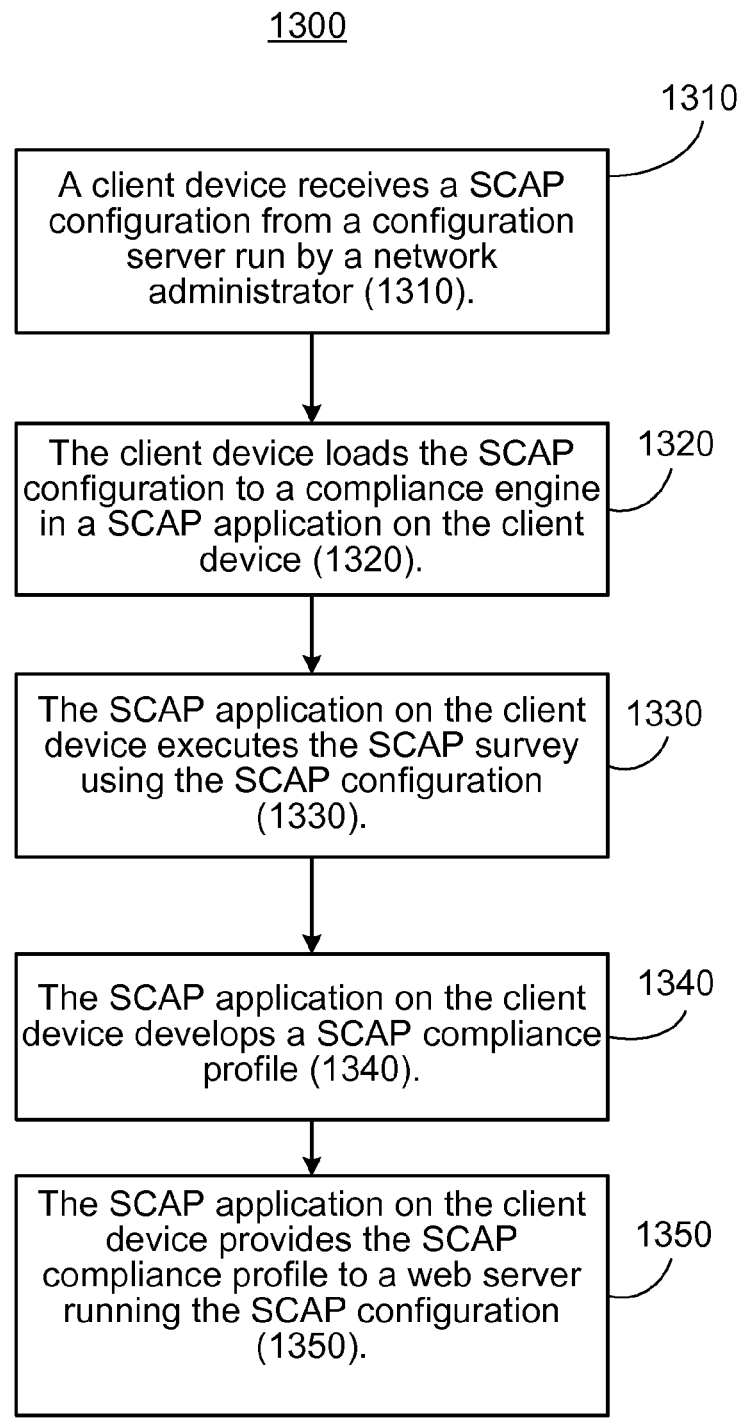
FIG. 13 is a flow chart of a process by which a client executes a SCAP survey and provides the results to a server.

FIG. 13 is a flow chart of a process 1300 by which a client executes a SCAP survey and provides the results to a server. A client device receives a SCAP configuration from a configuration server run by a network administrator (1310). The network administrator may belong to an organization that only permits certain configurations to be used and requires a compliance survey to be run every 30 days. The client device loads the SCAP configuration to a compliance engine in a SCAP application on the client device (1320). The SCAP configuration may include a background process that is launched upon startup to automatically execute a compliance survey. Launching the SCAP application may involve the SCAP application transmitting a request from the client device to a SCAP server that determines if revisions to the SCAP configuration are available. If so, the SCAP server delivers the SCAP configuration to the client device.

The SCAP application on the client device executes the SCAP survey using the SCAP configuration (1330). The SCAP application analyzes one or more constituent components, values, and settings to determine the state of the client device relative to a guideline or rule specified in the SCAP configuration. As a result of investigating these one or more parameters, the SCAP application on the client device develops a SCAP compliance profile (1340). Developing the SCAP compliance profile includes developing metrics for the individual client device as well as developing a higher level analytic score that describes the degree of compliance level, patching, and vulnerability for the client device. For example, the SCAP application may develop a score for the client device enabling a high level description to be presented as was shown in FIG. 1.

The SCAP application on the client device provides the SCAP compliance profile to a web server running the SCAP configuration (1350). Providing the SCAP compliance profile may be provided as part of the power up or power down sequence, at a scheduled time, during an idle period, or in response to receiving a command from a SCAP server and/or client device.

Figure 14:
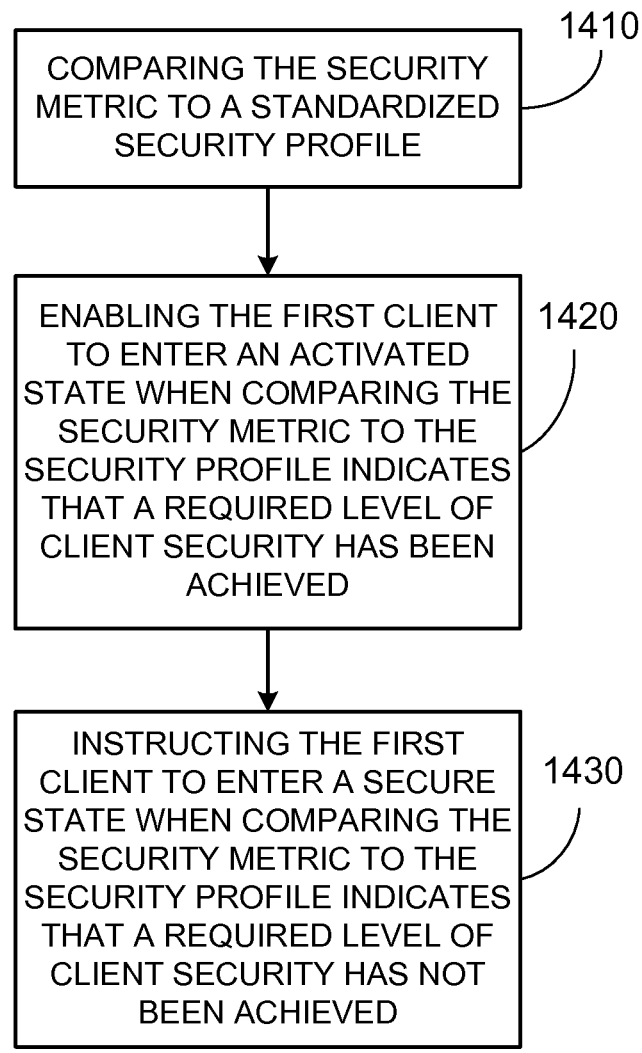
FIG. 14 is a flow chart of a process by which a client is instructed to enter a secure state.

FIG. 14 is a flow chart of a process 1400 by which a client is instructed to enter a secure state. The operations shown in process 1400 may be performed in association with the operations discussed previously with respect to FIGS. 13 and 14. For example, the operations may be performed as a compliance survey is being performed before or in association with a login and/or power up sequence. Generally, the operations shown in process 1400 are used to instruct a client device to enter an activated state when a threshold degree of compliance has been attained and enter a secured state when a threshold degree of compliance has not been achieved.

Initially, the security metric is compared to a standardized security profile (1410). Comparing the security metric to a standardized security profile may include comparing one or more scores to a threshold score used to determine whether permitting the client to operate normally represents an undesirable degree of risk.

The first client is enabled to enter an activated state when comparing the security metric to the security profile indicates that a required level of client security has been achieved (1420). The activated state may include a configuration that lets the user visit trusted web sites, utilize network resources (e.g., printers and file shares), and exchange email. A SCAP application on a client device may permit the client device to enter an activated state when a compliance score, a vulnerability score, and a patch score are above 80% and a compliance survey has been executed in the previous 30 days.

The first client is instructed to enter a secured state when comparing the security metric to the security profile indicates that a required level of client security has not been achieved (1430). The secured state may only permit a limited degree of use, such as, for example, only permitting the client device to operate in standalone mode and/or only permitting the client device to exchange messages with other users within the organization.

A SCAP application on a client device may instruct the client device to initiate corrective actions. The corrective actions may include adding or removing applications, blocking or adding system services, and/or changing system and application settings. The corrective actions may require a system administrator, and the SCAP application may launch a help desk ticket that that schedules and instructs a system administrator to perform corrective action on the client device. As a result of performing one or more corrective actions, the SCAP application may require the client device to perform a power down and power up sequence in order for system and application settings to take effect.

Figure 15:
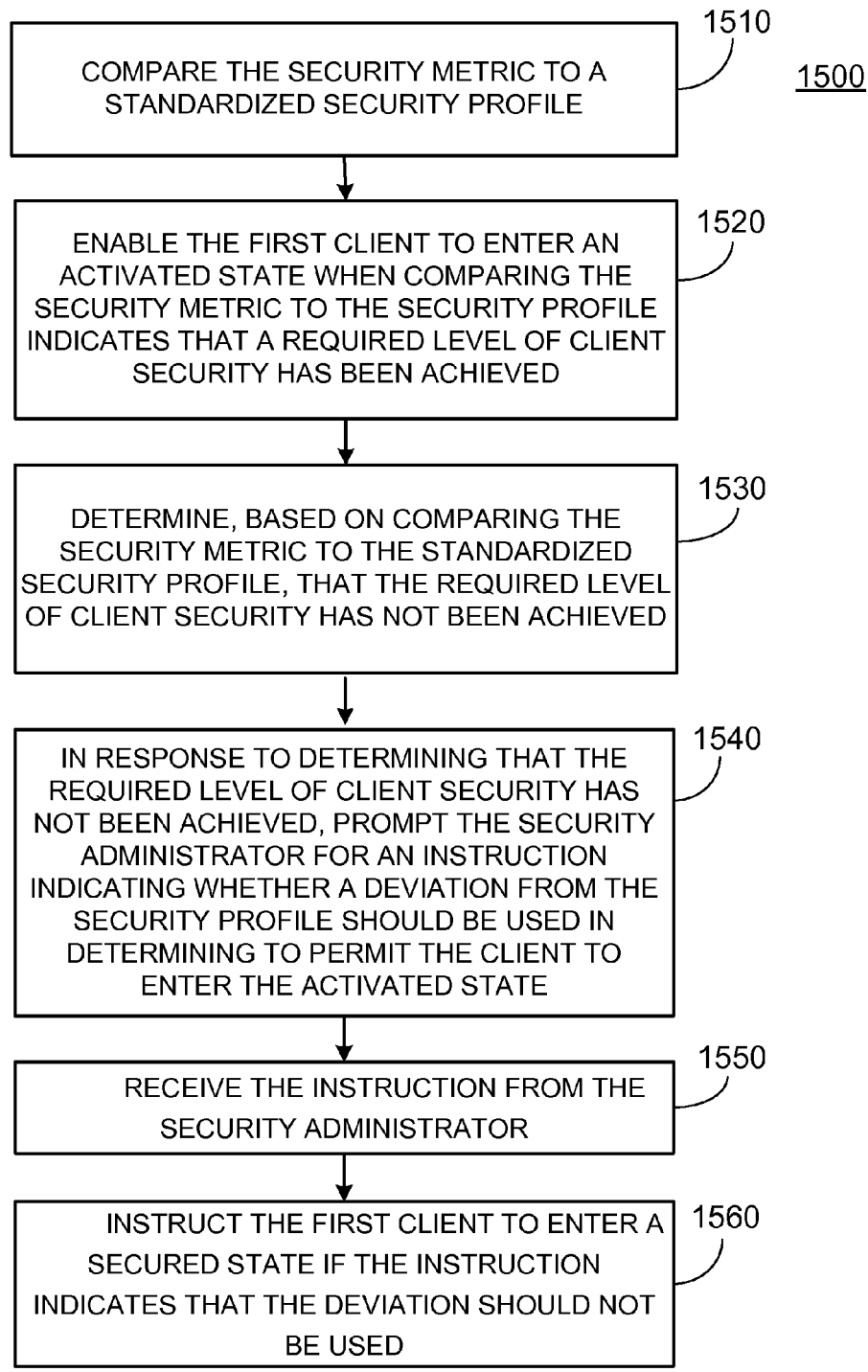
FIG. 15 is a flow chart of a process by which a client determines that a required level of security has been received.

FIG. 15 is a flow chart of a process 1500 by which a client determines that a required level of security has been received. Initially, a system compares the security metric to a standardized security profile (1510). A first client device may compare a compliance profile to a security score required to access a network, or a SCAP server may receive a compliance profile from a first client device authenticating to a network. The first client enters an activated state when comparing the security metric to the security profile indicates that a required level of client security has been achieved (1520). For example, if the compliance profile indicates that a first client device is associated with a score of 81, and the security metric is 80, then the first client device may be provided with a full range of access.

Alternatively, based on comparing the security metric to the standardized security profile, the system determines that the required level of client security has not been achieved (1530). The compliance profile may indicate a score of 69, where the security metro is 80.

In response to determining that the required level of client security has not been achieved, the system prompts the security administrator for an instruction indicating whether a deviation from the security profile should be used in determining to permit the client to enter the activated state (1540). For example, the security administrator may determine that the first client device represents a mission critical system, or that the user cannot afford to be interrupted at this time. Alternatively, the security administrator may determine that the required change requires changes that are too expensive or cumbersome, or that a threat is not worth the impact of the interruption at this time.

The system receives the instruction from the security administrator (1550). The instruction may include a message that was generated from a graphical user interface and launched through the application. Alternatively, the instruction may include an option that was selected in a form encompassed in an electronic mail message.

In response to receiving the instruction, the first client is enabled to enter an activated state if the instruction indicates that the deviation should be used (1560). In one configuration, the deviation includes a command that the parameter should not be considered in calculating a score. In another configuration, the deviation indicates that the client device should enter an activated state for a designated period of time irrespective of the score. In yet another configuration, the deviation indicates that the severity of the alarm should not trigger a responsive action, though other conditions may trigger an alarm that precludes the first client device from entering an activated state.

Alternatively, the first client is instructed to enter a secured state if the instruction indicates that the deviation should not be used (1570). A network administrator may determine that a remedial action is required because the first client device represents too important of a system to be subjected to one or more risks associated with the proposed deviation.

Figure 16:
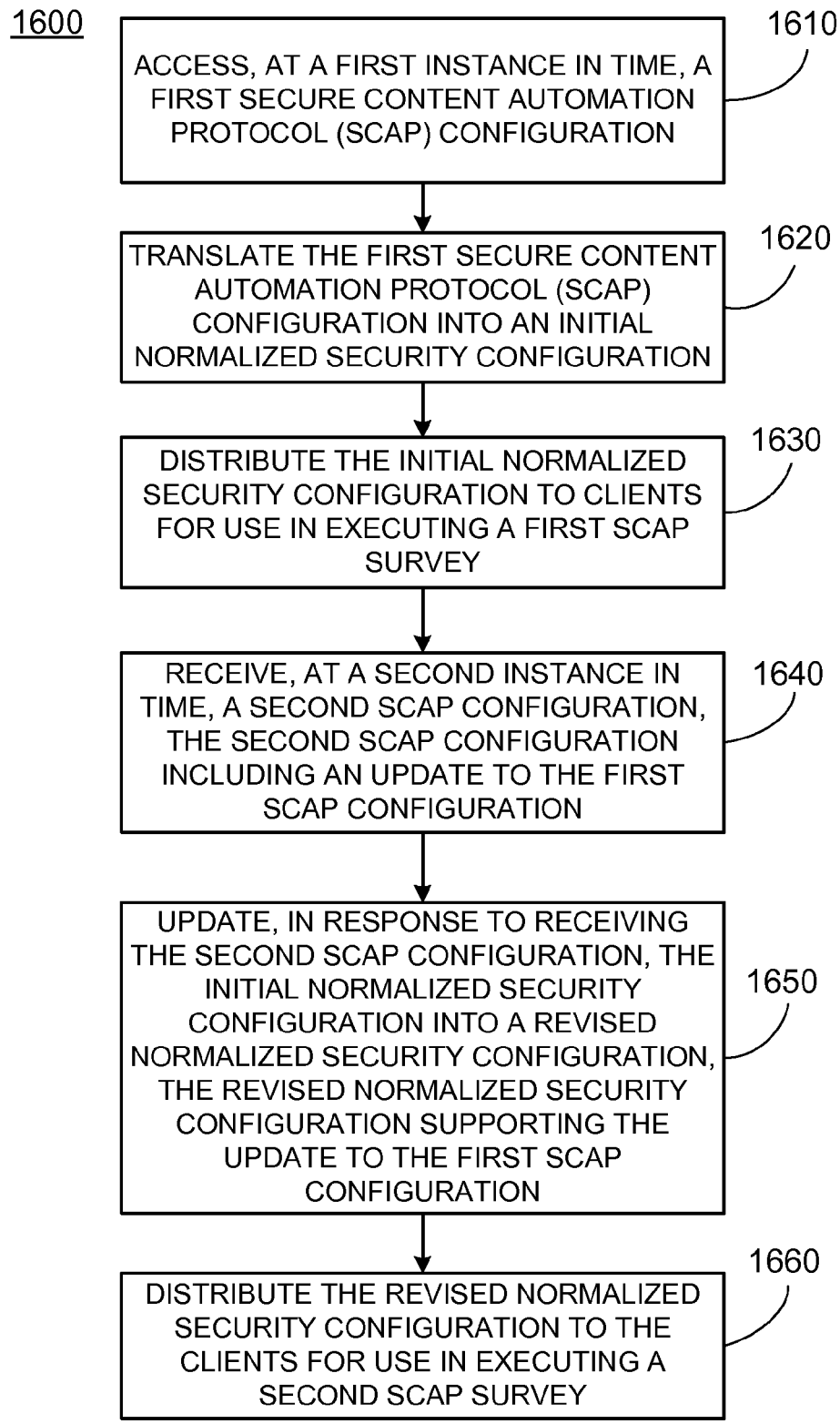
FIG. 16 is a flow chart of a process by which a client receives a normalized security configuration for use in executing a SCAP survey.

FIG. 16 is a flow chart of a process 1600 by which a client receives a normalized security configuration for use in executing a SCAP survey. Generally, process 1600 describes a process by which a normalized security configuration can be used to manage security for an enterprise of devices.

Initially, at a first instance in time, a SCAP configuration is accessed (1610). Accessing the SCAP configuration may include accessing a SCAP configuration that is stored on a SCAP server that administers a SCAP compliance regime for an organization. The first Secure Content Automation Protocol (SCAP) configuration is translated into an initial normalized security configuration (1620). The SCAP configuration may be translated into an eXtensible Markup Language (XML) configuration that describes the checks run by a SCAP engine. Because a SCAP configuration may vary with time to reflect different underlying systems and different configurations, using a normalized security configuration may be used to provide a degree of abstraction that reduces the administrative burden of maintaining a SCAP application on a client device.

The initial normalized security configuration is distributed to clients for use in executing a first SCAP survey (1630). For example, an XML file may be distributed to clients during a weekly update process.

At a second instance in time, a second SCAP configuration is received, the second SCAP configuration including an update to the first SCAP configuration (1640). The update may include a description of a new patch, or an indication that a particular service should be blocked. In response to receiving the second SCAP configuration, the initial normalized security configuration is updated into a revised normalized security configuration, the revised normalized security configuration supporting the update to the first SCAP configuration (1650). The revised normalized security configuration may include a description of the update in XML format. In one configuration, the revised normalized security configuration represents a concatenation of new XML code to the end of a file. In another configuration, the revised normalized security configuration represents a revision to existing XML code. The revised normalized security configuration is distributed to the clients for use in executing a second SCAP survey (1660). An XML file with the revised rules may be transmitted to clients during an update process.

Figure 17:
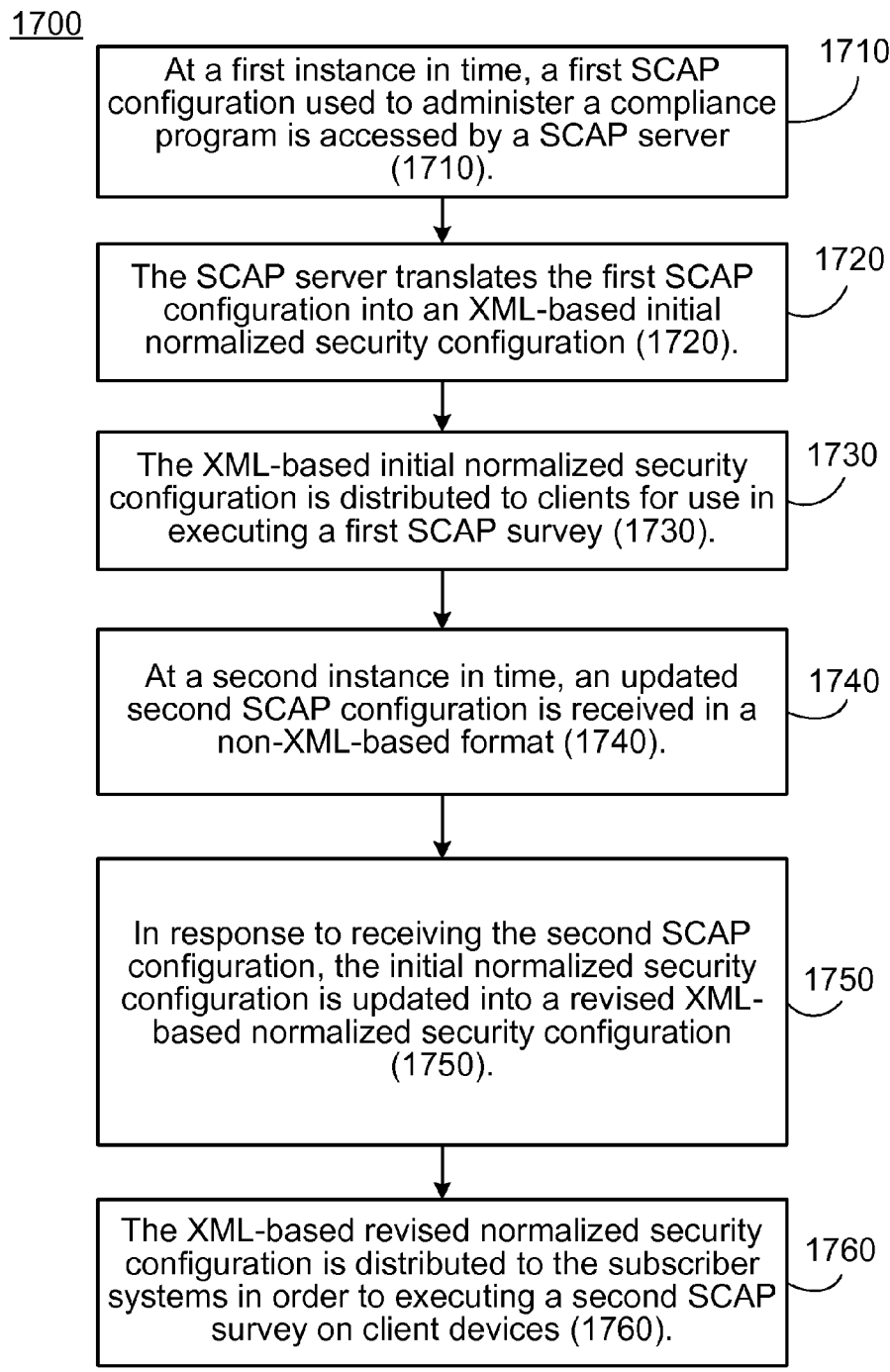
FIG. 17 is a flow chart of a process by which a normalized security configuration is maintained for use in executing a SCAP survey.

FIG. 17 is a flow chart of a process by which a normalized security configuration is maintained for use in executing a SCAP survey. At a first instance in time, a first SCAP configuration used to administer a compliance program is accessed by a SCAP server (1710). A network administrator working with a software developer may install an enterprise SCAP system that includes a hierarchy of reporting system and components on client devices. For instance, the network administrator may configure a SCAP server to access SCAP configurations from a distribution server. The SCAP server translates the first SCAP configuration into an XML-based initial normalized security configuration (1720). A software developer may receive a SCAP configuration and process the SCAP configuration so that subscribers to an SCAP service may receive the SCAP configurations in a normalized format that shields end-users from having to process new and sometimes difficult-to-process conventions. The XML-based initial normalized security configuration is distributed to clients for use in executing a first SCAP survey (1730). The initial normalized security configuration may be installed in association with an installation of a SCAP compliance engine on a client device. At a second instance in time, an updated second SCAP configuration is received in a non-XML-based format (1740). In one configuration, the updated second SCAP configuration includes a security systems software provider receiving an update to the SCAP standard from NIST. The security systems software provider then distributes the normalized SCAP configuration through subscriptions to a software distribution service. In response to receiving the second SCAP configuration, the initial normalized security configuration is updated into a revised XML-based normalized security configuration (1750). In one configuration, the revised XML-based normalized security configuration is generated by compared the differences between different SCAP configuration files and translating the differences into an XML description. In another configuration, the new SCAP configuration file is completely translated using a translation engine that maps SCAP policies into an XML description. The XML-based revised normalized security configuration is distributed to the subscriber systems in order to executing a second SCAP survey on client devices (1760).

Figure 18:
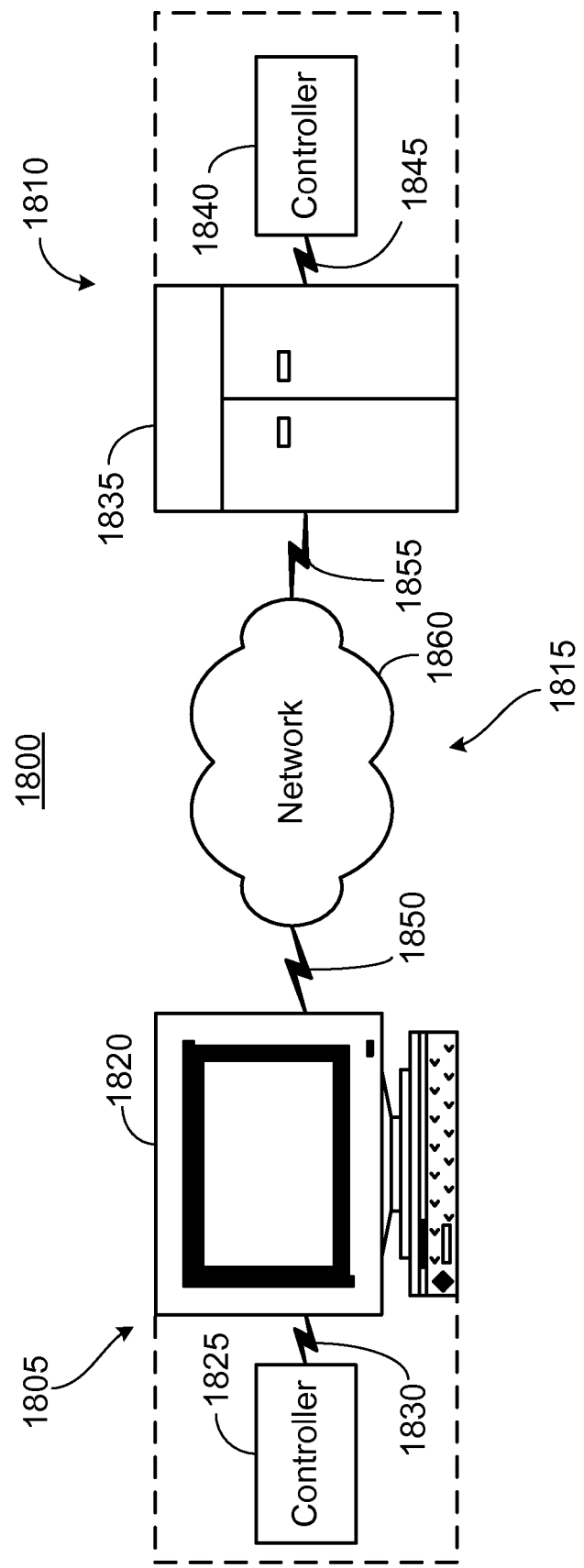
FIG. 18 is a block diagram of a communications system.

Referring to FIG. 18, a communications system 1800 is capable of delivering and exchanging data between a client system 1805 and a host system 1810 through a communications link 1815. The client system 1805 typically includes one or more client devices 1820 and/or client controllers 1825, and the host system 1810 typically includes one or more host devices 1835 and/or host controllers 1840. For example, the client system 1805 or the host system 1810 may include one or more general-purpose computers (e.g., personal computers), one or more special-purpose computers (e.g., devices specifically programmed to communicate with each other and/or the client system 1805 or the host system 1810), or a combination of one or more general-purpose computers and one or more special-purpose computers. The client system 1805 and the host system 1810 may be arranged to operate within or in concert with one or more other systems, such as, for example, one or more LANs ("Local Area Networks") and/or one or more WANs ("Wide Area Networks").

The client device 1820 (or the host controller 1835) is generally capable of executing instructions under the command of a client controller 1825 (or a host controller 1840). The client device 1820 (or the host device 1835) is connected to the client controller 1825 (or the host controller 1840) by a wired or wireless data pathway 1830 (or pathway 1845) capable of delivering data.

The client device 1820, the client controller 1825, the host device 1835, and the host controller 1840 each typically include one or more hardware components and/or software components. An example of a client device 1820 or a host device 1835 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 1825 or a host controller 1840 is a software application loaded on the client device 1820 or the host device 1835 for commanding and directing communications enabled by the client device 1820 or the host device 1835. Other examples include a program, a piece of code, an instruction, a device, a computer, a computer system, or a combination thereof, for independently or collectively instructing the client device 1820 or the host device 1835 to interact and operate as described. The client controller 1825 and the host controller 1840 may be embodied permanently or temporarily in any type of machine, component, physical or virtual equipment, storage medium, or propagated signal capable of providing instructions to the client device 1820 or the host device 1835.

The communications link 1815 typically includes a delivery network 1860 capable of enabling direct or indirect communication between the client system 1805 and the host system 1810, irrespective of physical separation. Examples of a delivery network 1860 include the Internet, the World Wide Web, WANs, LANs, analog or digital wired and wireless telephone networks (e.g. PSTN, ISDN, and xDSL), radio, television, cable, satellite, and/or any other delivery or tunneling mechanism for carrying data. The communications link 1815 may include communication pathways 1850, 1855 that enable communications through the one or more delivery networks 1860 described above. Each of the communication pathways 1850, 1855 may include, for example, a wired, wireless, cable or satellite communication pathway.

Figure 19:
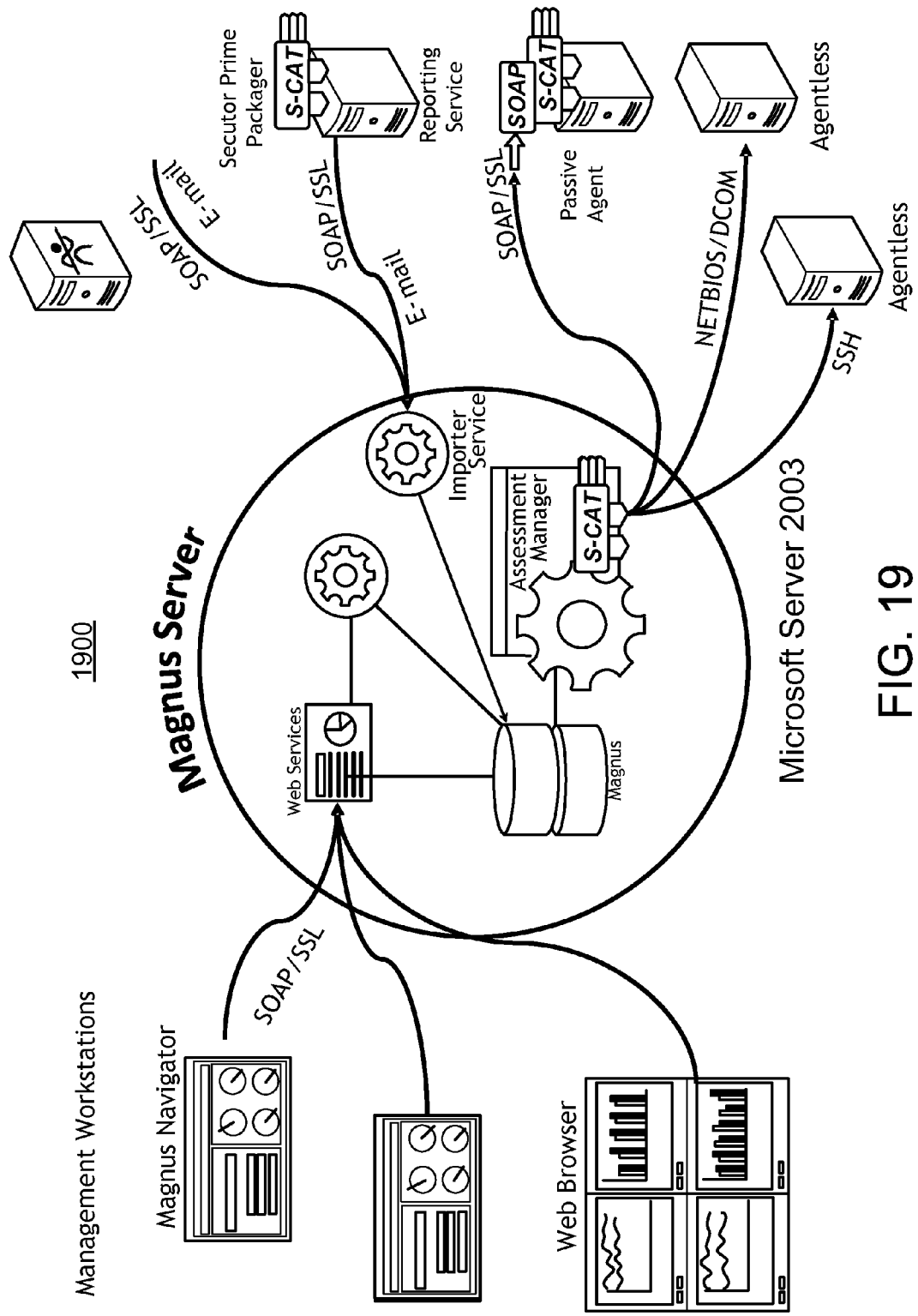
FIG. 19 is a block diagram of a communications system that enables an administrator to administer a compliance protocol for an organization.
Figure 20:
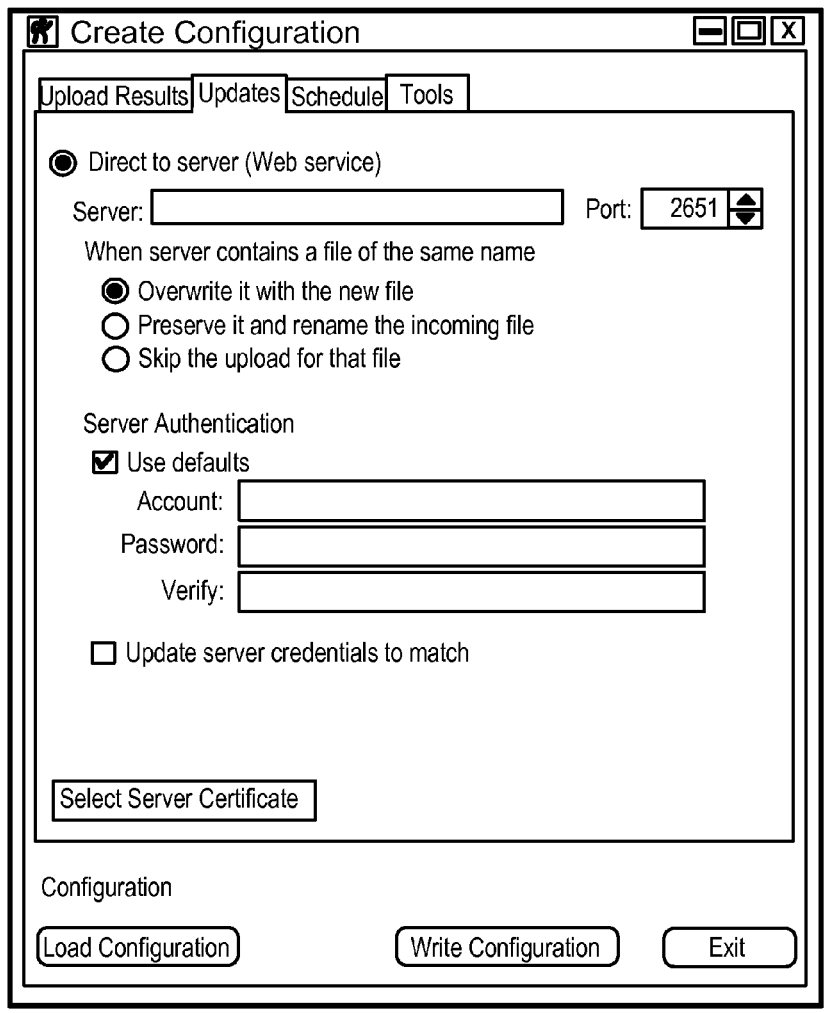
FIGS. 20-25 illustrate a user interface configured to build a package for an asynchronous configuration.
Figure 21:
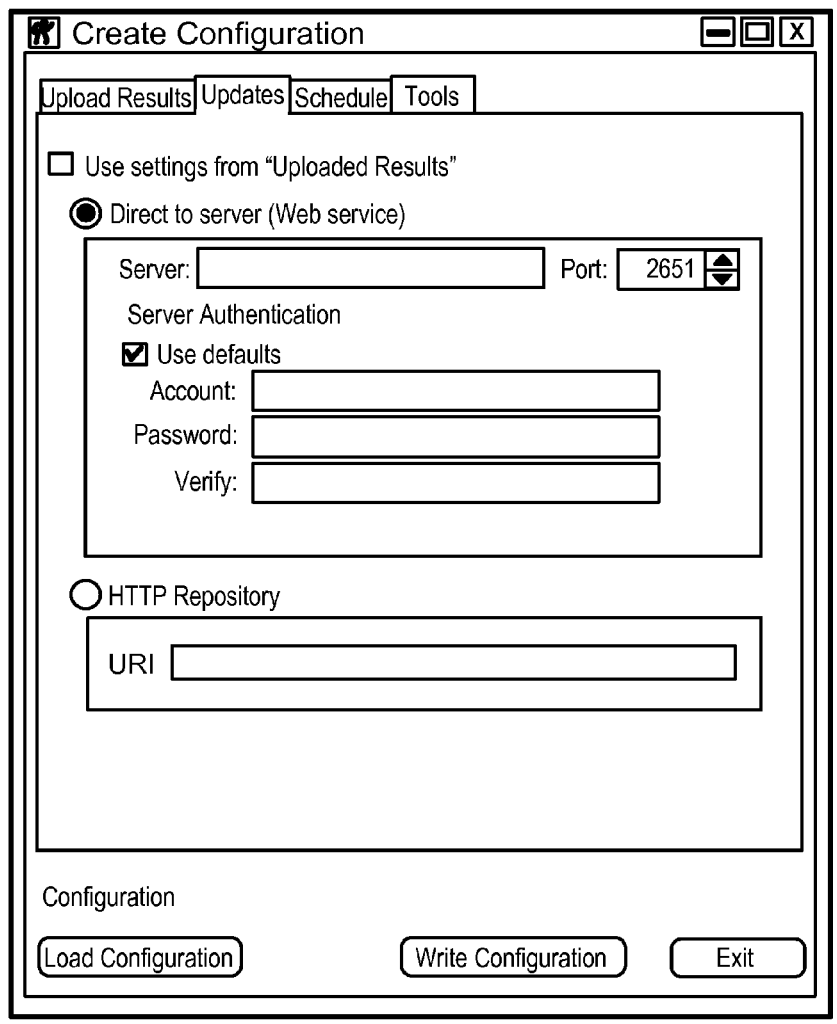
Figure 22:
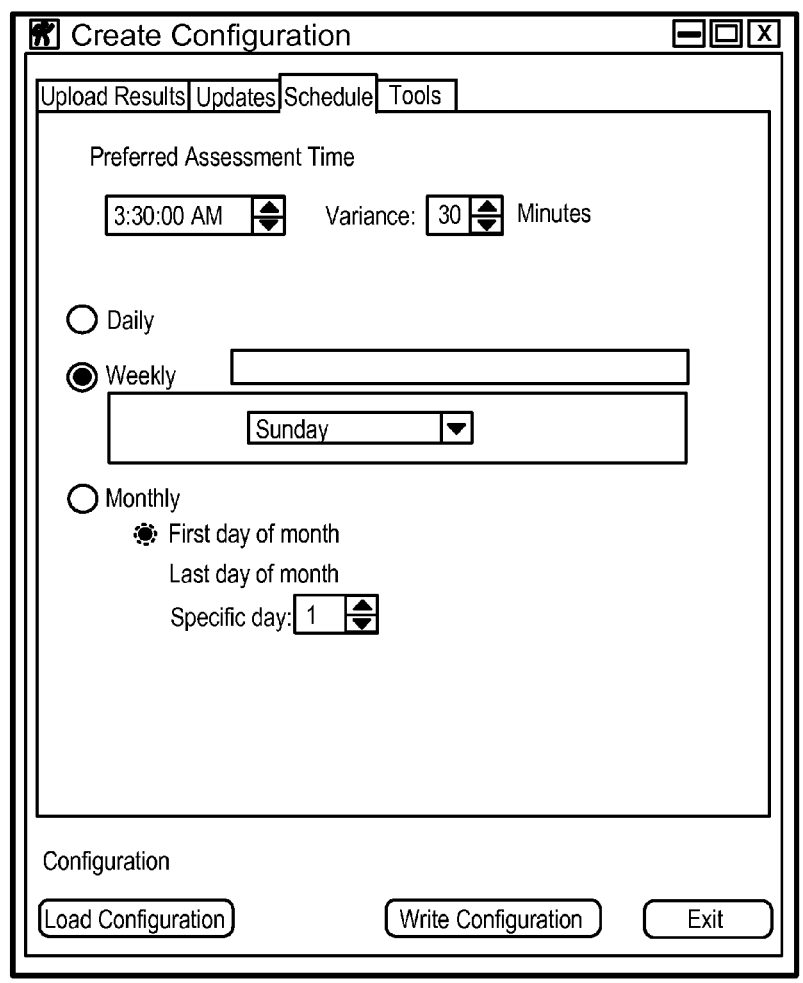
Figure 23:
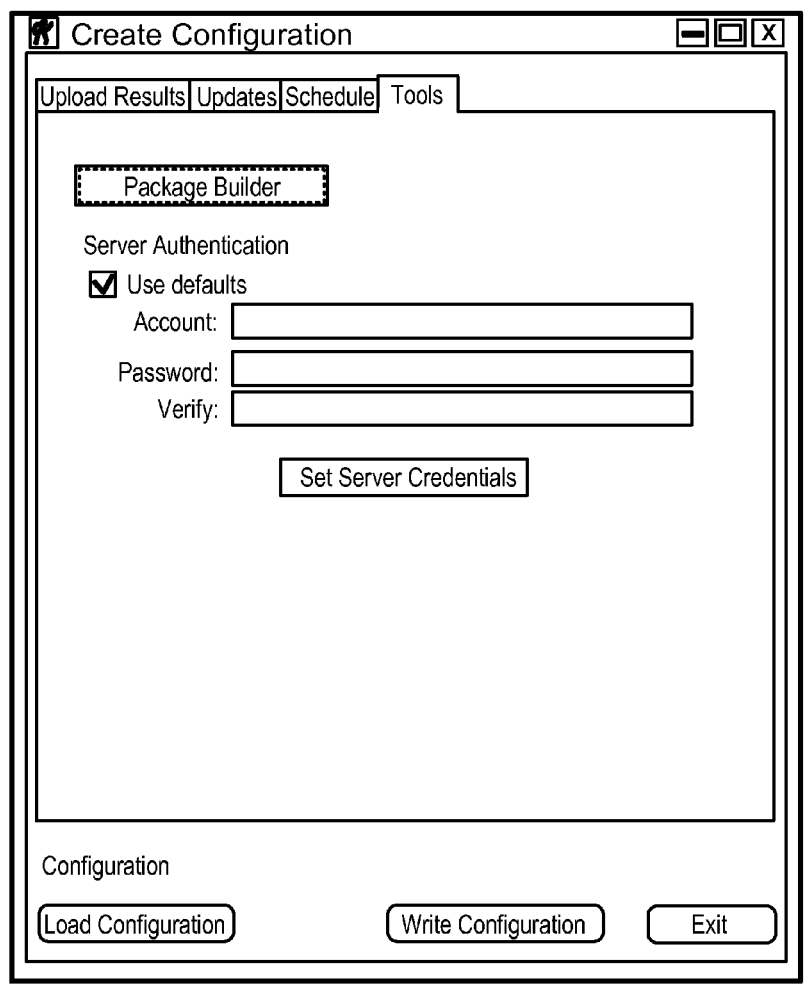
Figure 24:
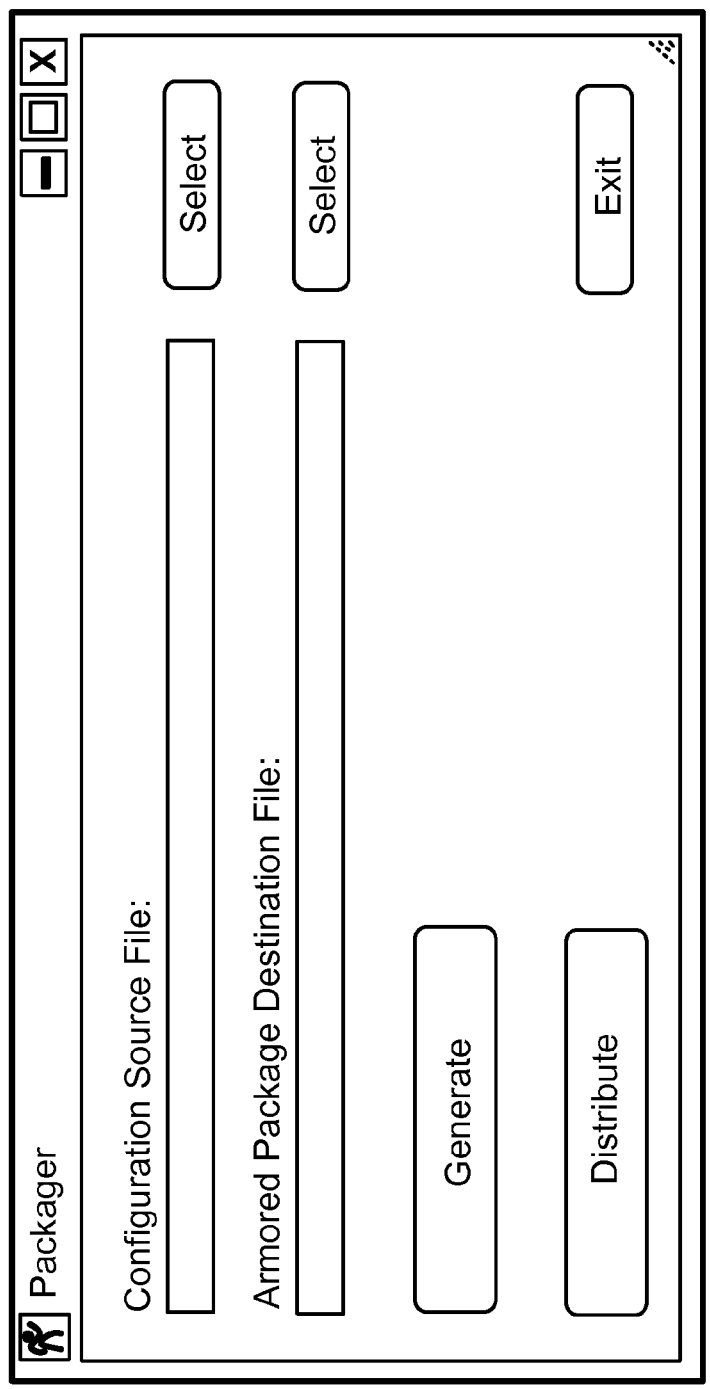
Figure 25:
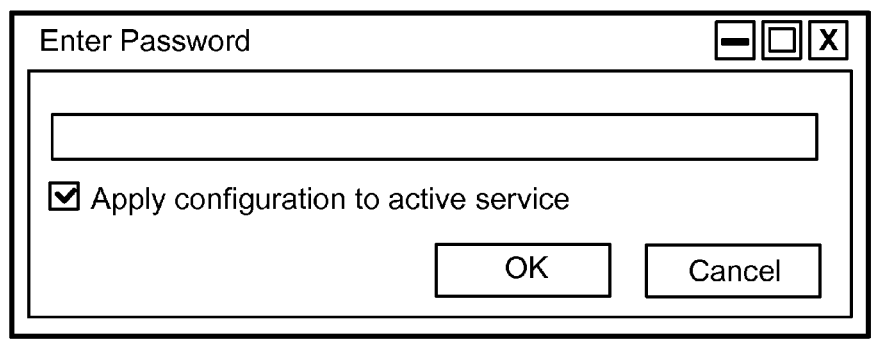

FIG. 19 is a block diagram of a communications system 1900 that enables an administrator to administer a compliance protocol for an organization. Generally, communications system 1900 illustrates how an administrators system may interface with a SCAP server. The SCAP server in turn may interface through a variety of transport mechanisms to interface with a SCAP client.

Although much of the description described aspects of a client server architecture, the SCAP may work in a standalone mode, for example, using a command-line interface. Alternatively or in addition, a standalone module or executable may be packaged in a module that enables the standalone module to be distributed in a client-server architecture or in a messaging module. The SCAP compliance engine may be configured to work in association with WBEM ("Web-based Enterprise Management") or with WMI ("Windows Management Instrumentation").

The SCAP architecture may be configured to use both push and pull mechanisms. In one configuration, a client device is configured to execute a SCAP compliance survey on a periodic basis and report the results upon completion of the SCAP survey. The client device also may be configured to only report the SCAP compliance profile if an anomaly, alarm or special situation is detected. The SCAP compliance profile may be configured to store the SCAP compliance profile and provide the SCAP compliance profile in response to receiving a request for the SCAP compliance profile from a SCAP server.

A network administrator also may instruct a SCAP server to launch a SCAP survey for an enterprise on a scheduled basis, in response to identifying a new threat, and/or in response to receiving an alarm that certain systems have been compromised.

The results (e.g., the SCAP compliance profile or information related to the SCAP compliance profile such as a summary) may be available locally in both detailed and summary form in a variety of formats. For example, the results may available in XCCDF form, MAGNUS XML, or as a registry entry. The SCAP survey may be initiated via a variety of mechanisms including a graphical user interface tool and/or an API ("Application Programming Interface") call from another program.

The SCAP architecture may be configured to operate an asynchronous environment. An SCAP application on client device may not always be able to establish and/or maintain communications with a remote device. Rather, instructions and SCAP configuration information may be received using, for example, an electronic mail messaging application.

For example, a network administrator may be tasked with managing client devices for a mobile sales force or a collection of distributed offices. Because of intermittent connectivity to laptop devices, geographic limitations restricting access by help desk personnel, intervening firewalls, and other factors, access between client devices and a SCAP server may be intermittent. To combat these challenges, the network administrator may rely on a configuration of a SCAP architecture configured to accommodate the challenges imposed by intermittent access. A network administrator may push a package of instructions using an asynchronous infrastructure, such as an electronic mail messaging system. The SCAP server may push the package by sending SCAP instructions and configuration information in the package to a list of recipients (e.g., a list of email addresses associated with a particular devices). Upon receiving the SCAP instructions and configuration information through an electronic mail application on a client device. A SCAP application may establish a connection with the electronic mail messaging application so that the electronic mail messaging application is configured to electronic mail messages that include SCAP data, instructions, and/or configuration information to the SCAP information on the client device. The passed information may be passed using, for example, and API.

The asynchronous environment is not limited to use of electronic mail messaging systems. For example, a client device may reference a web server to receive the SCAP instructions, data, or configuration information. Similarly, an RSS ("Really Simple Syndication") feed using an RSS reader may be used to receive SCAP information and instructions.

Irrespective of the asynchronous delivery mechanism used to deliver the SCAP package with SCAP data and instructions, an SCAP administrators toolkit may be used to configure the package. FIGS. 20-25 illustrate different GUIs for a package builder than can be used to create and push a package using a SCAP server, which in turn may distribute the SCAP information to isolated client devices. The SCAP server may be configured to push a package so that the package is accessible across a plurality of platforms. For example, the SCAP server may push the SCAP information using electronic mail messaging, an RSS Server and using an RSS server. Depending on the user behavior, one of the delivery mechanisms may be utilized before the other delivery mechanism. In one configuration, the SCAP survey is executed more than once. In another configuration, executing the SCAP survey as a result of a first delivery vehicle may preclude execution of an additional SCAP survey. The RSS server may remove an identity of the client device from a file being published in an RSS feed to prevent duplication. Alternatively, the SCAP application may disregard additional commands to run the SCAP survey if a rule in a policy has been satisfied (e.g., execute a SCAP survey on a periodic basis). The SCAP application also may disregard additional commands to run the SCAP survey if a rule in a policy indicates that the survey should not be run if a particular instruction or configuration (e.g., a batch) has already been run. The instructions may be labeled in order to track which files have been executed.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a random or serial access memory device, or a combination of one or more of them.

The term "client device" and "server" (e.g., host device) encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other module suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Thus, particular implementations of the specification have been described. Other implementations are within the scope of the following claims. For example, the actions recited in the claims can be performed in a different order and still achieve desirable results.

What is claimed is:

1. A method of enabling a client to receive secure packages, the method comprising:
   establishing, on the client, a connection between a security configuration management application and an electronic mail messaging application, wherein the security configuration management application and the electronic mail messaging application are both executed on the client;
   configuring the electronic mail messaging application to route a security message with a security update for the security configuration management application from the electronic mail messaging application to the security configuration management application;
   receiving, at the electronic mail messaging application on the client, the security message from a security configuration manager, wherein the security configuration manager is executed on one or more computers external to the client;
   automatically routing the security update from the electronic mail messaging application to the security configuration management application;
   inspecting, using the security configuration management application, the security update to ensure that the security update is valid;
   loading, in response to inspecting the security update to ensure that the security update is valid, instructions within the security update to the security configuration management application;
   executing, using the security configuration management application, the loaded instructions,
   wherein executing the loaded instructions comprises:
      performing a security compliance survey of the client;
      determining a security metric of the client based on an outcome of the security compliance survey;
      comparing the determined security metric of the client with a compliance threshold;
      when the determined security metric of the client meets or exceeds the compliance threshold, instructing the client to enter an activated state in which one or more features of the client are activated; and
      when the determined security metric of the client does not meet the compliance threshold, instructing the client to enter a secured state in which one or more features of the client are limited.

2. The method of claim 1 further comprising:
   configuring the security configuration management application to route a confirmation message to the security configuration manager using the electronic mail messaging application; and
   sending, using the electronic mail messaging application, the confirmation message to the security configuration manager.

3. The method of claim 1 wherein automatically routing the security update from the electronic mail messaging application to the security configuration management application includes automatically prompting the user to confirm that the security update should be routed to the security configuration management application.

4. The method of claim 1 wherein automatically routing the security update from the electronic mail messaging application to the security configuration management application includes sending the security update to the security configuration management application without user interaction.

5. The method of claim 1 wherein receiving the security message includes receiving the security message addressed to a particular machine.

6. The method of claim 1 wherein receiving the security message includes receiving the security message addressed to a user identity.

7. The method of claim 1 wherein receiving the security message includes receiving the security message addressed to a particular piece of software.

8. The method of claim 1 further comprising receiving, on the client, security actions generated by an administrator with appropriate authority, using an electronic mail messaging infrastructure to which the electronic mail messaging application interfaces.

9. The method of claim 1 wherein establishing the connection includes passing instructions using an API within the client.

10. A system configured to enable a client to receive secure packages, the system comprising a processor and instructions that when executed on the processor cause the processor to perform operations that include: establishing, on the client, a connection between a security configuration management application and an electronic mail messaging application, wherein the security configuration management application and the electronic mail messaging application are both executed on the client; configuring the electronic mail messaging application to route a security message with a security update for the security configuration management application from the electronic mail messaging application to the security configuration management application; receiving, at the electronic mail messaging application on the client, the security message from a security configuration manager, wherein the security configuration manager is executed on one or more computers external to the client; automatically routing the security update from the electronic mail messaging application to the security configuration management application; inspecting, using the security configuration management application, the security update to ensure that the security update is valid; loading, in response to inspecting the security update to ensure that the security update is valid, instructions within the security update to the security configuration management application; executing, using the security configuration management application, the loaded instructions,
   wherein executing the loaded instructions comprises:
      performing a security compliance survey of the client;
      determining a security metric of the client based on an outcome of the security compliance survey;

comparing the determined security metric of the client with a compliance threshold;

when the determined security metric of the client meets or exceeds the compliance threshold, instructing the client to enter an activated state in which one or more features of the client are activated; and when the determined security metric of the client does not meet the compliance threshold, instructing the client to enter a secured state in which one or more features of the client are limited.

11. A non-transitory computer readable medium storing instructions that, when executed by one or more processors, cause the one or more processors to perform operations that include: establishing, on a client, a connection between a security configuration management application and an electronic mail messaging application, wherein the security configuration management application and the electronic mail messaging application are both executed on the client; configuring the electronic mail messaging application to route a security message with a security update for the security configuration management application from the electronic mail messaging application to the security configuration management application; receiving, at the electronic mail messaging application on the client, the security message from a security configuration manager, wherein the security configuration manager is executed on one or more computers external to the client; automatically routing the security update from the electronic mail messaging application to the security configuration management application; inspecting, using the security configuration management application, the security update to ensure that the security update is valid; loading, in response to inspecting the security update to ensure that the security update is valid, instructions within the security update to the security configuration management application; executing, using the security configuration management application, the loaded instructions, wherein executing the loaded instructions comprises:

performing a security compliance survey of the client;

determining a security metric of the client based on an outcome of the security compliance survey;

comparing the determined security metric of the client with a compliance threshold;

when the determined security metric of the client meets or exceeds the compliance threshold, instructing the client to enter an activated state in which one or more features of the client are activated; and when the determined security metric of the client does not meet the compliance threshold, instructing the client to enter a secured state in which one or more features of the client are limited.

* * * * *